US012523630B2

(12) United States Patent
Ito

(10) Patent No.: US 12,523,630 B2
(45) Date of Patent: Jan. 13, 2026

(54) MANUFACTURING METHOD FOR GAS SENSOR ELEMENT, GAS SENSOR ELEMENT, AND GAS SENSOR

(71) Applicant: NGK SPARK PLUG CO., LTD., Nagoya (JP)

(72) Inventor: Kazuma Ito, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 714 days.

(21) Appl. No.: 17/605,757

(22) PCT Filed: Apr. 24, 2020

(86) PCT No.: PCT/JP2020/017798
§ 371 (c)(1),
(2) Date: Oct. 22, 2021

(87) PCT Pub. No.: WO2020/246174
PCT Pub. Date: Dec. 10, 2020

(65) Prior Publication Data
US 2022/0214303 A1 Jul. 7, 2022

(30) Foreign Application Priority Data

Jun. 6, 2019 (JP) ................................. 2019-106265

(51) Int. Cl.
G01N 27/409 (2006.01)
G01N 27/407 (2006.01)
(52) U.S. Cl.
CPC ....... G01N 27/409 (2013.01); G01N 27/4073 (2013.01); G01N 27/4075 (2013.01)

(58) Field of Classification Search
CPC .......... G01N 27/4073; G01N 27/4075; G01N 27/409
See application file for complete search history.

(56) References Cited

U.S. PATENT DOCUMENTS

2006/0009344 A1* 1/2006 Sone ................... C23C 28/3455
501/104

FOREIGN PATENT DOCUMENTS

| JP | 4-166757 A | 6/1992 |
| JP | 11-316211 A | 11/1999 |
| JP | 2008-286569 A | 11/2008 |
| JP | 2009-192518 A | 8/2009 |
| JP | 2017-078679 A | 4/2017 |

(Continued)

OTHER PUBLICATIONS

JP-2009192518-A machine translation (Year: 2009).*

(Continued)

Primary Examiner — C. Sun
(74) Attorney, Agent, or Firm — Sughrue Mion, PLLC

(57) ABSTRACT

A method for manufacturing a gas sensor element (100) including a solid electrolyte (110) and an electrode (130) formed on a surface (110a) of the solid electrolyte (110). The method includes: a slurry application step S3 of forming a first slurry layer (13) by applying a first slurry containing monoclinic zirconia and tetragonal/cubic zirconia to the surface (110a) of the solid electrolyte (110); a heat treatment step S4 of forming a base layer (14) by a heat treating the solid electrolyte (110) having the first slurry layer (13) formed thereon; and a plating step S5 of forming the electrode (130) by plating the base layer (14) using a plating solution containing a noble metal.

6 Claims, 14 Drawing Sheets

(56) References Cited

FOREIGN PATENT DOCUMENTS

| | | |
|---|---|---|
| JP | 2017-083289 A | 5/2017 |
| JP | 2019-085286 A | 6/2019 |

OTHER PUBLICATIONS

M. Asadikiya, Phase diagram for a nano-yttria-stabilized zirconia system, RSC Adv. 2016, vol. 6, pp. 17438-17445. (Year: 2016).*
International Search Report for PCT/JP2020/017798 dated Jul. 14, 2020.
Written Opinion for PCT/JP2020/017798 dated Jul. 14, 2020.

* cited by examiner

MANUFACTURING METHOD FOR GAS SENSOR ELEMENT, GAS SENSOR ELEMENT, AND GAS SENSOR

CROSS-REFERENCE TO RELATED APPLICATIONS

This application is a National Stage of International Application No. PCT/JP2020/017798 filed Apr. 24, 2020, claiming priority from Japanese Patent Application No. 2019-106265, filed Jun. 6, 2019.

BACKGROUND OF THE INVENTION

1. Field of the Invention

The present invention relates to a method for manufacturing a gas sensor element, a gas sensor element, and a gas sensor.

2. Description of the Related Art

A gas sensor including a gas sensor element is known (see, for example, Patent Literature 1). Such a type of gas sensor detects the gas concentration of a specific gas (for example, oxygen, $NO_x$, etc.) in exhaust gas discharged from various exhaust systems mounted on an automobile or a boiler. Such a gas sensor is used, for example, in a temperature environment of room temperature (for example, 25° C.) to 900° C. or higher.

The gas sensor element includes a solid electrolyte and a pair of electrodes provided on both surfaces of the solid electrolyte such that the solid electrolyte is sandwiched therebetween. One of the pair of electrodes is a detection electrode to be exposed to exhaust gas, and the other electrode is a reference electrode to be exposed to a reference gas. Normally, a porous protective layer for protecting the gas sensor element from toxic substances, exhaust condensed water, and the like in exhaust gas is formed on the outer surface of the gas sensor element.

Patent Literature 1: Japanese Unexamined Patent Application Publication No. 2017-78679

3. Problems Addressed by the Invention

During use of the gas sensor, when the gas sensor element in a high temperature state comes into contact with moisture such as condensed water contained in exhaust gas, the gas sensor element may rapidly contract and a crack may occur in the detection electrode and the solid electrolyte. When a crack occurs in the detection electrode and the solid electrolyte, the desired electromotive force is no longer generated between the detection electrode and the reference electrode, resulting in malfunction of the gas sensor element.

As described above, the detection electrode in the conventional gas sensor element is normally protected by a porous protective layer, and has durability (water resistance) against a certain amount of moisture. However, it is also assumed that, during use of the gas sensor, the detection electrode of the gas sensor element comes into contact with moisture exceeding the allowable amount for the porous protective layer. Therefore, there is a demand for a gas sensor element having such excellent water resistance that a detection electrode or the like is not damaged even in such a case.

SUMMARY OF INVENTION

It is therefore an object of the present invention is to provide a method for manufacturing a gas sensor element having excellent water resistance, and a gas sensor element and a gas sensor having excellent water resistance.

As a result of extensive research conducted for achieving the above object, the present inventor has found that, in a gas sensor element including a solid electrolyte and an electrode formed on the surface of the solid electrolyte, when the electrode contains monoclinic zirconia, tetragonal/cubic zirconia, and a noble metal and is composed of a single layer, the electrode has excellent water resistance. Thus, the present inventor has been completed.

More particularly, the above object has been achieved, in a first aspect (1) of the present invention, by providing a method for manufacturing a gas sensor element including a solid electrolyte and an electrode formed on a surface of the solid electrolyte, the manufacturing method including: a slurry application step of forming a first slurry layer by applying a first slurry containing monoclinic zirconia and tetragonal/cubic zirconia to the surface of the solid electrolyte; a heat treatment step of forming a base layer by heat treating the solid electrolyte having the first slurry layer formed thereon; and a plating step of forming the electrode by plating the base layer using a plating solution containing a noble metal.

In a second aspect (2), the present invention provides a method for manufacturing a gas sensor element including a solid electrolyte and an electrode formed on a surface of the solid electrolyte, the method including: a slurry application step of forming a second slurry layer by applying a second slurry containing monoclinic zirconia, tetragonal/cubic zirconia, and a noble metal to the surface of the solid electrolyte; and a heat treatment step of forming the electrode by heat treating the solid electrolyte having the second slurry layer formed thereon.

In a preferred embodiment (3) of the method for manufacturing the gas sensor element according to (1) or (2) above, a content of the monoclinic zirconia in the first slurry or the second slurry is not less than 40 mass % and not greater than 90 mass % with respect to 100 mass % of a total amount of the monoclinic zirconia and the tetragonal/cubic zirconia.

In another preferred embodiment (4) of the method for manufacturing the gas sensor element according to (1) or (2) above, a content of the monoclinic zirconia in the first slurry or the second slurry is not less than 40 mass % and not greater than 70 mass % with respect to 100 mass % of a total amount of the monoclinic zirconia and the tetragonal/cubic zirconia.

In a third aspect (5), the present invention provides a gas sensor element including a solid electrolyte and an electrode formed on a surface of the solid electrolyte, wherein the electrode contains monoclinic zirconia, tetragonal/cubic zirconia, and a noble metal, and the electrode is a single layer electrode.

In a fourth aspect (6), the present invention provides a gas sensor including: the gas sensor element according to (5) above; and a metal shell holding the gas sensor element.

Effects of the Invention

According to the present invention, it is possible to provide a method for manufacturing a gas sensor element having excellent water resistance, and a gas sensor element and a gas sensor having excellent water resistance.

DESCRIPTION OF REFERENCE NUMERALS

Figure 1:
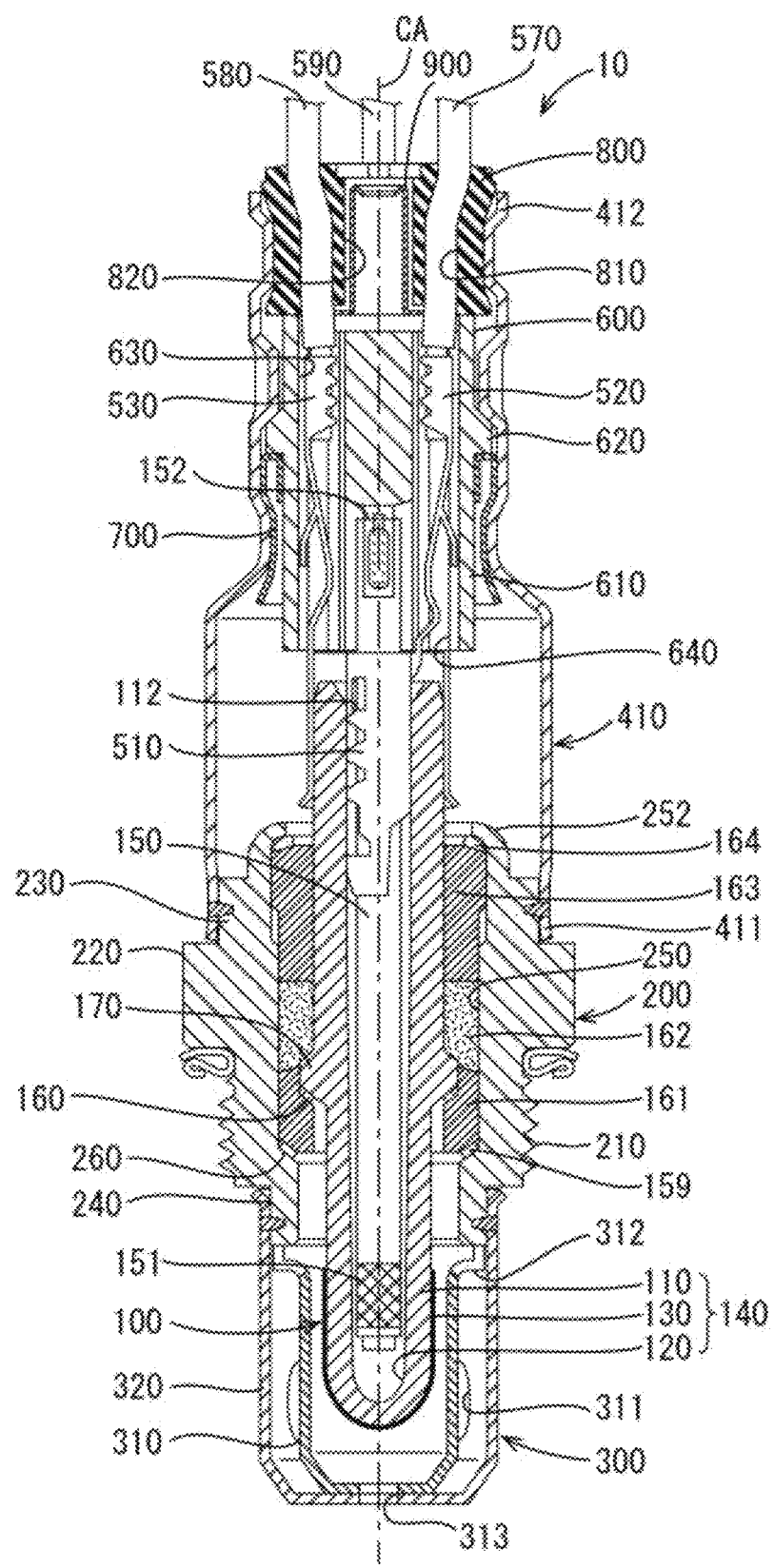
FIG. 1 is a cross-sectional view showing a configuration of a sensor according to Embodiment 1.

Reference Numerals used to identify various features in the drawings include the following.

10: sensor
100, 100A, 100B: gas sensor element
110: solid electrolyte
120: reference electrode
130, 130A, 130B: detection electrode
132, 132A: base
13: first slurry layer
14: base layer
15: pore
23: second slurry layer

DETAILED DESCRIPTION OF THE PREFERRED EMBODIMENTS

The invention will now be described in detail with reference to the drawings. However, the present invention should not be construed as being limited thereto.

Embodiment 1

Embodiment 1 of the present invention will be described with reference to FIG. 1 to FIG. 6. FIG. 1 is a cross-sectional view showing a configuration of a sensor according to Embodiment 1. The sensor (an example of a gas sensor) 10 is fixed to an exhaust pipe of an internal combustion engine (engine), which is not shown, and measures the concentration of a specific gas contained in exhaust gas as a gas to be measured. Examples of the specific gas include oxygen and $NO_x$. The sensor 10 of the present embodiment measures an oxygen gas concentration.

FIG. 1 shows a cross-section of the sensor 10 in an axial line CA direction. The axial line CA is an axial line extending in the longitudinal direction of the sensor 10 at the center of the sensor 10. Hereinafter, the lower side in the sheet of FIG. 1 is referred to as a "front side", and the upper side in the sheet of FIG. 1 is referred to as a "rear side".

The sensor 10 mainly includes a gas sensor element 100, a metal shell 200, a protector 300, a ceramic heater 150, an outer casing 410, a separator 600, and a grommet 800.

The gas sensor element 100 outputs a signal for detecting the oxygen concentration in exhaust gas. The gas sensor element 100 includes a detection portion 140 to be directed to the exhaust gas, on the front side, and a tubular hole 112 for inserting a connection terminal 510 therein is formed on the rear side in the gas sensor element 100. The detection portion 140 mainly includes a solid electrolyte 110, a reference electrode 120 formed on the inner surface of the solid electrolyte 110, and a detection electrode 130 formed on the outer surface of the solid electrolyte 110. These components will be described below. The gas sensor element 100 is fixed inside the metal shell 200 in a state where the detection portion 140 projects from the front end of the metal shell 200 and the tubular hole 112 projects from the rear end of the metal shell 200. In addition, a flange portion 170 is provided at substantially the center of the gas sensor element 100.

The metal shell 200 is mainly used for holding the gas sensor element 100 and mounting the sensor 10 to the exhaust pipe. The metal shell 200 is a tubular metal member that surrounds the periphery of the gas sensor element 100. The metal shell 200 of the present embodiment is formed from SUS430.

A front end portion 240, a thread portion 210, a flange portion 220, a rear end portion 230, and a crimp portion 252 are formed on the outer periphery of the metal shell 200 in this order from the front side. The front end portion 240 is a portion formed on the front side of the metal shell 200 such that the outer diameter of the metal shell 200 is reduced. The metal shell 200 and the protector 300 are joined together in a state where the front end portion 240 of the metal shell 200 is inserted into the protector 300. The thread portion 210 is an external thread formed for screwing and mounting the sensor 10 to the exhaust pipe. The flange portion 220 is a portion formed such that the outer shape of the metal shell 200 projects in a polygonal shape toward the outer side in the radial direction. The flange portion 220 is used to engage a tool for mounting the sensor 10 to the exhaust pipe. Therefore, the flange portion 220 is formed in a shape (for example, a hexagon bolt shape) that allows the flange portion 220 to engage the tool. The rear end portion 230 is a portion formed on the rear side of the metal shell 200 such that the outer diameter of the metal shell 200 is reduced. The metal shell 200 and the outer casing 410 are joined together in a state where the rear end portion 230 of the metal shell 200 is inserted into the outer casing 410.

A tubular hole 250 and a step portion 260 are formed on the inner periphery of the metal shell 200. The tubular hole 250 is a through hole which penetrates the metal shell 200 along the axial line CA. The tubular hole 250 holds the gas sensor element 100 along the axial line CA. The step portion 260 is a portion formed on the front side of the metal shell 200 such that the inner diameter of the metal shell 200 is reduced. A ceramic holder 161 engages the step portion 260 of the metal shell 200 via a packing 159. Furthermore, the flange portion 170 of the gas sensor element 100 engages the ceramic holder 161 via a packing 160. Moreover, a seal portion 162, a ceramic sleeve 163, and a metal ring 164 are disposed on the rear side of the ceramic holder 161 in the tubular hole 250 of the metal shell 200. The seal portion 162 is a talc layer formed by filling the tubular hole 250 with talc powder. The seal portion 162 blocks the ventilation between the front side and the rear side in the axial line CA direction in the gap between the gas sensor element 100 and the metal shell 200. The ceramic sleeve 163 is a tubular insulating member that surrounds the outer periphery of the gas sensor element 100. The metal ring 164 is a stainless steel flat washer that surrounds the outer periphery of the gas sensor element 100.

In the metal shell 200, the crimp portion 252 is further formed by bending the opening end on the rear side to the radially inner side (tubular hole 250 side). The seal portion 162 is pressed via the metal ring 164 and the ceramic sleeve 163 by the crimp portion 252, so that the gas sensor element 100 is fixed inside the metal shell 200.

The protector 300 protects the gas sensor element 100. The protector 300 is a bottomed cylindrical metal member. The protector 300 is fixed to the front end portion 240 by laser welding so as to surround the periphery of the gas sensor element 100 projecting from the front side of the metal shell 200. The protector 300 is composed of a double protector including an inner protector 310 and an outer protector 320. The inner protector 310 and the outer protector 320 are formed with gas introduction holes 311 and 312 and a gas discharge hole 313, respectively. The gas introduction holes 311 and 312 are through holes formed for introducing exhaust gas to the inner side of the protector 300 (to the gas sensor element 100). The gas discharge hole 313 is a through hole for discharging the exhaust gas from the inside of the protector 300 toward the outside of the protector 300.

The ceramic heater 150 raises the temperature of the gas sensor element 100 to a predetermined active temperature to enhance the conductivity of oxygen ions in the detection portion 140 and stabilize operation of the gas sensor element 100. The ceramic heater 150 is provided within the tubular hole 112 of the gas sensor element 100. The ceramic heater 150 includes a heating portion 151 and a heater connection terminal 152. The heating portion 151 is a heat generating resistor formed of a conductor such as tungsten, and generates heat upon receiving power. The heater connection terminal 152 is provided on the rear side of the ceramic heater 150 and is connected to a heater lead wire 590. The heater connection terminal 152 receives power from the outside via the heater lead wire 590.

The outer casing 410 protects the sensor 10. The outer casing 410 is a cylindrical metal member that has a through hole along the axial line CA. The rear end portion 230 of the metal shell 200 is inserted into a front end portion 411 of the outer casing 410. The outer casing 410 and the metal shell 200 are joined together by laser welding. The grommet 800 described below is fitted into a rear end portion 412 of the outer casing 410. The grommet 800 is fixed to the outer casing 410 by being crimped to the rear end portion 412 of the outer casing 410.

The separator 600 has a substantially cylindrical shape and is formed of an insulating member of alumina or the like. The separator 600 is disposed inside the outer casing 410. The separator 600 is formed with a separator body 610 and a separator flange portion 620. The separator body 610 is formed with: a lead wire through hole 630 that penetrates the separator 600 along the axial line CA: and a holding hole 640 that is opened on the front side of the separator 600. Element lead wires 570 and 580 described below and the heater lead wire 590 are inserted from the rear side of the lead wire through hole 630. A rear end portion of the ceramic heater 150 is inserted into the holding hole 640. The inserted ceramic heater 150 is positioned in the axial line CA direction by the rear end surface thereof being brought into contact with the bottom surface of the holding hole 640. The separator flange portion 620 is a portion formed on the rear side of the separator 600 such that the outer diameter of the separator 600 is increased. The separator flange portion 620 is supported by a holding member 700 disposed in the gap between the outer casing 410 and the separator 600, thereby fixing the separator 600 inside the outer casing 410.

The grommet 800 is formed from a fluororubber having excellent heat resistance, or the like. The grommet 800 is fitted into the rear end portion 412 of the outer casing 410. The grommet 800 is formed with: a through hole 820 that penetrates the grommet 800 along the axial line CA in a center portion thereof; and four lead wire insertion holes 810 that penetrate the grommet 800 along the axial line CA around the through hole 820. A filter unit 900 (a filter and a metal tube) for closing the through hole 820 is disposed in the through hole 820.

The element lead wires 570 and 580 and the heater lead wire 590 are each formed of a conductor coated with an insulating coating made of a resin. Each of rear end portions of the conductors of the element lead wires 570 and 580 and the heater lead wire 590 is electrically connected to a connector terminal provided to a connector. A front end portion of the conductor of the element lead wire 570 is crimped and connected to a rear end portion of an inner connection terminal 520 that is internally fitted on the rear side of the gas sensor element 100. The inner connection terminal 520 is a conductor that electrically connects the element lead wire 570 and the reference electrode 120 of the gas sensor element 100. A front end portion of the conductor of the element lead wire 580 is crimped and connected to a rear end portion of an outer connection terminal 530 that is externally fitted on the rear side of the gas sensor element 100. The outer connection terminal 530 is a conductor that electrically connects the element lead wire 580 and the detection electrode 130 of the gas sensor element 100. A front end portion of the conductor of the heater lead wire 590 is electrically connected to the heater connection terminal 152 of the ceramic heater 150. In addition, the element lead wires 570 and 580 and the heater lead wire 590 are inserted into the lead wire through hole 630 of the separator 600 and the lead wire insertion hole 810 of the grommet 800 and extended from the inside of the outer casing 410 toward the outside of the outer casing 410.

The sensor 10 introduces outside air into the tubular hole 112 of the gas sensor element 100 by passing the outside air through the filter unit 900 from the through hole 820 of the grommet 800 and introducing the outside air into the outer casing 410. The outside air introduced into the tubular hole 112 of the gas sensor element 100 is used as a reference gas that serves as a reference for the sensor 10 (gas sensor element 100) to detect oxygen in exhaust gas. In addition, the sensor 10 is configured such that the gas sensor element 100 is exposed to exhaust gas (gas to be measured) by introducing the exhaust gas into the protector 300 through the gas introduction holes 311 and 312 of the protector 300. Accordingly, the gas sensor element 100 generates an electromotive force corresponding to the difference in oxygen concentration between the reference gas and the exhaust gas as gas to be measured. The electromotive force of the gas sensor element 100 is outputted as a sensor output via the element lead wires 570 and 580 to the outside of the sensor 10.

Figure 2:
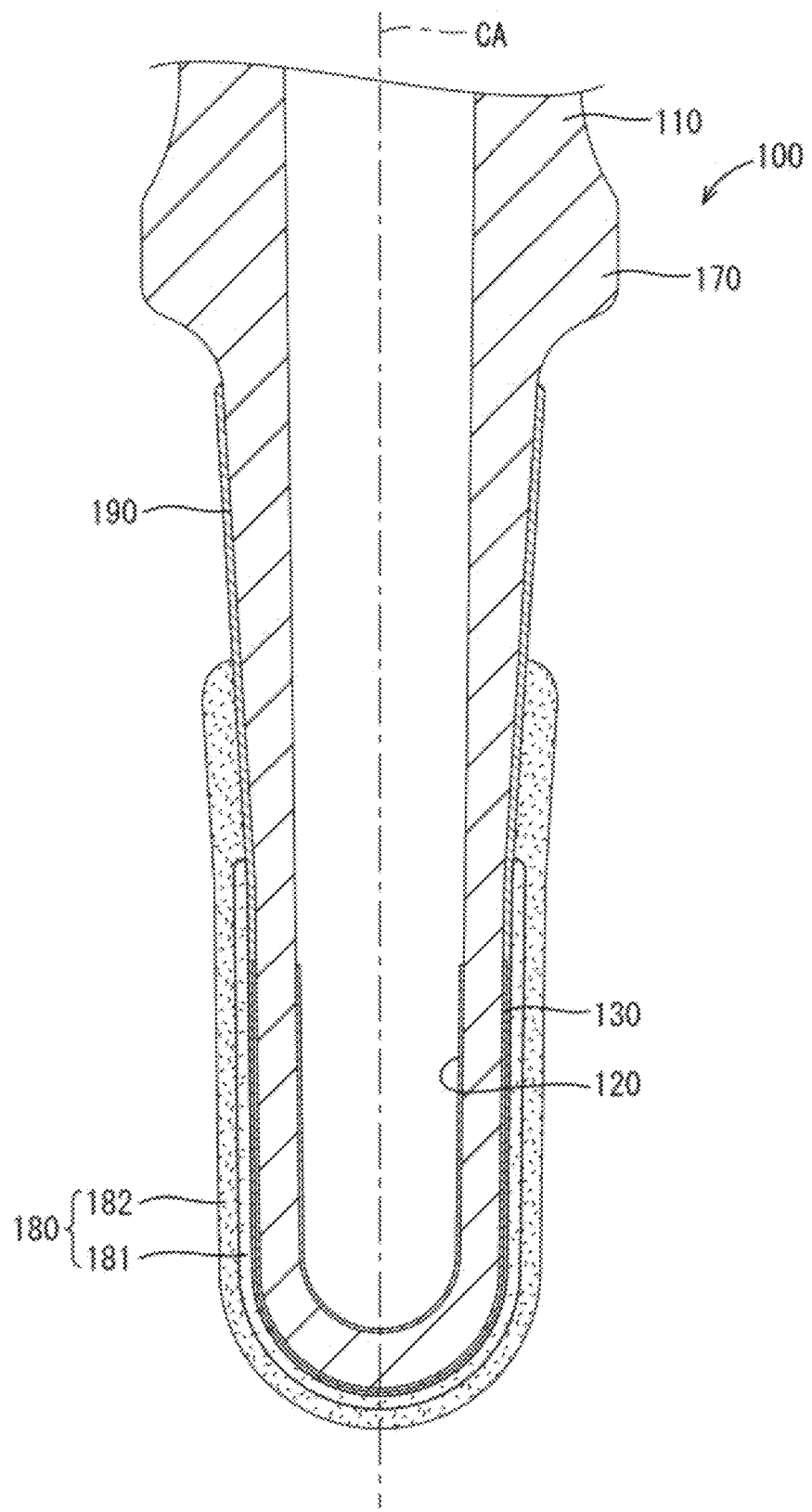
FIG. 2 is a cross-sectional view showing a configuration of a gas sensor element.

FIG. 2 is a cross-sectional view showing a configuration of the gas sensor element 100. FIG. 2 shows a cross-section of the front side of the gas sensor element 100 in the axial line CA direction. The gas sensor element 100 of the present embodiment includes the solid electrolyte 110, the reference electrode 120, the detection electrode 130, a porous protective layer 180, and a base layer 190.

The solid electrolyte 110, together with the reference electrode 120 and the detection electrode 130, functions as the detection portion 140 that detects the oxygen concentration in exhaust gas. The solid electrolyte 110 extends in the axial line CA direction and is formed in a bottomed tubular shape closed on the front side thereof. The solid electrolyte 110 is made of a material having oxide ion conductivity (oxygen ion conductivity). In the present embodiment, the solid electrolyte 110 is made of zirconia (zirconia oxide: $ZrO_2$) to which a stabilizer is added. In the present embodiment, yttrium oxide ($Y_2O_3$) is used as the stabilizer. Zirconia to which yttrium oxide is added is also referred to as yttria partially stabilized zirconia. Examples of the stabilizer used for the solid electrolyte 110 include, in addition to yttrium oxide, calcium oxide (CaO), magnesium oxide (MgO), cerium oxide ($CeO_2$), ytterbium oxide ($Yb_2O_3$), and scandium oxide ($Sc_2O_3$).

The reference electrode 120 is formed on the inner surface of the solid electrolyte 110 and is exposed to the reference gas. The reference electrode 120 is made of a noble metal. In the present embodiment, the reference electrode 120 is made of platinum (Pt). The reference electrode 120 is formed by electroless plating. Examples of the noble metal used for the reference electrode 120 include, in addition to platinum, platinum alloys, other noble metals such as rhodium, and other noble metal alloys.

The detection electrode 130 is formed on the outer surface of the solid electrolyte 110 and is exposed to the exhaust gas as the gas to be measured.

The porous protective layer 180 protects the gas sensor element 100. The porous protective layer 180 is formed, for example, from a material that contains one or more ceramic materials selected from the group consisting of alumina, titania, spinel, zirconia, mullite, zircon, and cordierite as a main component and that further contains glass. The porous protective layer 180 is disposed so as to cover the detection electrode 130 via the base layer 190. The porous protective layer 180 includes: an inner layer 181 disposed so as to cover the detection electrode 130; and an outer layer 182 disposed so as to cover the inner layer 181. The outer layer 182 has a lower porosity than the inner layer 181. The porous protective layer 180 may be omitted.

The base layer 190 improves adhesion of the porous protective layer 180 and protects the detection electrode 130. The base layer 190 is composed of a sprayed layer of a ceramic material such as spinel, and is a porous protective layer. The base layer 190 is formed so as to cover the detection electrode 130 from the front side of the outer surface of the solid electrolyte 110 to the vicinity of the flange portion 170 where the solid electrolyte 110 outwardly projects. The base layer 190 may be omitted.

The detection electrode 130 of the present embodiment contains a noble metal, zirconia or low-stabilizer-content zirconia, and high-stabilizer-content zirconia. In the present embodiment, platinum (Pt) is used as the noble metal. As the noble metal used for the detection electrode 130, platinum alloys, other noble metals such as rhodium, other noble metal alloys, etc., may be used in addition to platinum.

The content (mass %) of the noble metal in the detection electrode 130 is not particularly limited as long as the object of the present invention is not impaired. For example, the noble metal may be contained in a proportion of 75 mass % or greater and preferably 80 mass % or greater, and 90 mass % or less and preferably 85 mass % or less, with respect to the total mass (100 mass %) of the detection electrode 130.

In the detection electrode 130, the zirconia or the low-stabilizer-content zirconia, and the high-stabilizer-content zirconia are used in combination as a base. The base is used for the purposes of ensuring the adhesiveness of the detection electrode 130 to the solid electrolyte 110 and forming a three-phase interface that reacts with oxygen gas while supporting the noble metal (Pt or the like), for example.

The content (mass %) of the base in the detection electrode 130 is not particularly limited as long as the object of the present invention is not impaired. For example, the base may be contained in a proportion of 5 mass % or greater and preferably 10 mass % or greater, and 25 mass % or less and preferably 20 mass % or less, with respect to the total mass (100 mass %) of the detection electrode 130.

The "zirconia" used for the detection electrode 130 is zirconia to which a stabilizer described below is not added, and means pure zirconia ($ZrO_2$) containing no mixture other than inevitable impurities. The crystal structure (under normal temperature conditions) of such zirconia is monoclinic. The monoclinic zirconia undergoes a phase transition at high temperatures (for example, 1200° C.) and changes in volume.

The "low-stabilizer-content zirconia" means zirconia to which the stabilizer described below is added in a predetermined proportion such that the zirconia becomes monoclinic under normal temperature conditions. For example, in the case where yttrium oxide ($Y_2O_3$) is adopted as the stabilizer, the low-stabilizer-content zirconia means zirconia to which the stabilizer is added in a proportion of 4 mol % or less in terms of metal element. For other stabilizers, the addition proportion of the stabilizer can be determined as appropriate by using, for example, a well-known phase diagram or the like.

As the stabilizer used for the detection electrode 130, one or more stabilizers selected from the group consisting of yttrium oxide ($Y_2O_3$), calcium oxide (CaO), magnesium oxide (MgO), cerium oxide ($CeO_2$), ytterbium oxide ($Yb_2O_3$), scandium oxide ($Sc_2O_3$), and strontium oxide (SrO) can be used. In the present embodiment, yttrium oxide ($Y_2O_3$) is used as the stabilizer for the detection electrode 130.

Each stabilizer shown in the above group contains yttrium (Y), calcium (Cr), magnesium (Mg), cerium (Ce), ytterbium (Yb), scandium (Sc), or strontium (Cr) as a metal element.

The crystal structure (under normal temperature conditions) of the low-stabilizer-content zirconia is monoclinic.

The "high-stabilizer-content zirconia" means zirconia to which the stabilizer exemplified in the description of the "low-stabilizer-content zirconia" is added in a predetermined proportion such that the zirconia becomes tetragonal or cubic under normal temperature conditions. For example, in the case where yttrium oxide ($Y_2O_3$) is adopted as the stabilizer, the high-stabilizer-content zirconia means zirconia to which the stabilizer is added in a proportion of greater than 4 mol % and not greater than 20 mol % in terms of metal element. For other stabilizers, the addition proportion of the stabilizer can be determined as appropriate by using, for example, a well-known phase diagram or the like.

The crystal structure (under normal temperature conditions) of the high-stabilizer-content zirconia is tetragonal or cubic.

As described above, in the detection electrode 130, the zirconia or the low-stabilizer-content zirconia and the highstabilizer-content zirconia, which have crystal states different from each other, are used in combination.

In the detection electrode 130, the noble metal (Pt or the like), the zirconia or the low-stabilizer-content zirconia, and the high-stabilizer-content zirconia are mixed with each other and uniformly dispersed. Such a detection electrode 130 is formed as a single layer as a whole. In addition, the detection electrode 130 is continuously formed.

In the base of the detection electrode 130, the zirconia or the low-stabilizer-content zirconia and the high-stabilizer-content zirconia are mixed with each other and uniformly dispersed.

In the present description, the zirconia and the low-stabilizer-content zirconia, which are used for the detection electrode 130, are also collectively referred to as "monoclinic zirconia". In addition, the high-stabilizer-content zirconia is also referred to as "tetragonal/cubic zirconia".

In the case of the present embodiment, the zirconia is contained as "monoclinic zirconia".

As long as the object of the present invention is not impaired, the detection electrode 130 may contain a component other than the noble metal, the zirconia or the low-stabilizer-content zirconia, and the high-stabilizer-content zirconia which are described above.

The content of the zirconia or the low-stabilizer-content zirconia in the detection electrode 130 is preferably not less than 40 mass % and not greater than 90 mass % with respect to 100 mass % of the total of the zirconia or the low-stabilizer-content zirconia and the high-stabilizer-content zirconia. When the above content is within such a range, the detection electrode 130 has excellent water resistance.

The content of the zirconia or the low-stabilizer-content zirconia in the detection electrode 130 is preferably not less than 40 mass % and not greater than 90 mass % with respect to 100 mass % of the total of the zirconia or the low-stabilizer-content zirconia and the high-stabilizer-content zirconia. When the above content is within such a range, the detection electrode 130 has excellent water resistance and responsiveness.

Figure 3:
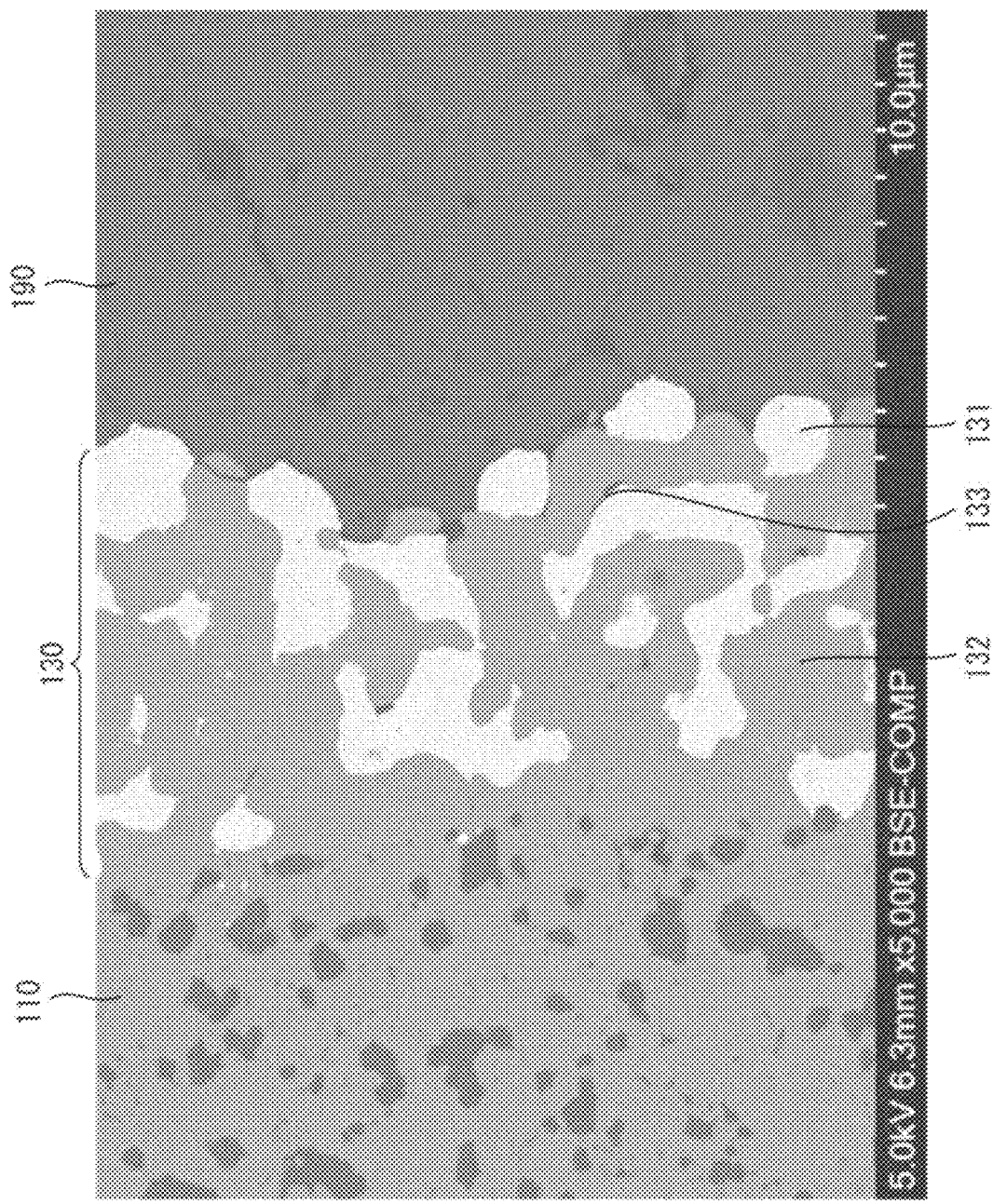
FIG. 3 shows an SEM image of a detection electrode.
Figure 4:
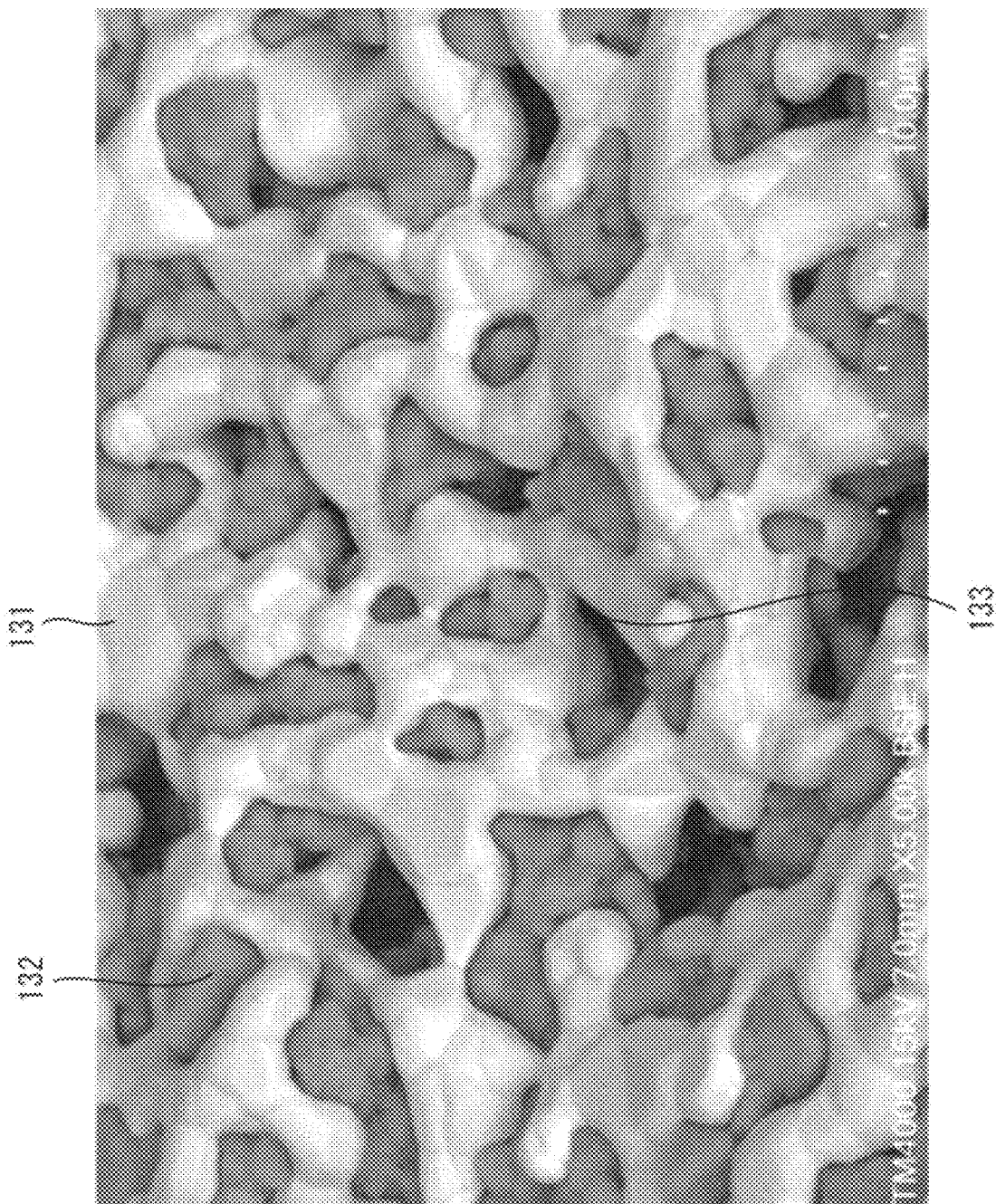
FIG. 4 shows an SEM image of the detection electrode.

FIG. 3 and FIG. 4 each show an SEM image of the detection electrode 130. FIG. 3 shows an image obtained by observing, with an SEM (Scanning Electron Microscope), a part of a cross-section obtained by cutting the detection electrode 130 in the thickness direction thereof. At substantially the center of FIG. 3, the detection electrode 130 is shown, and the solid electrolyte 110 is shown adjacently on the left side thereof. In addition, in FIG. 3, the base layer (sprayed layer) 190 of the porous protective layer 180 is shown adjacently on the right side of the detection electrode 130. The right-left direction in FIG. 3 corresponds to the thickness direction of the detection electrode 130.

In the detection electrode 130 shown in FIG. 3, the white part represents platinum (noble metal) 131, and the gray part that is in contact with the platinum 131 represents a base 132. In the detection electrode 130 shown in FIG. 3, the black part represents voids (gaps) 133. The base 132 of the present embodiment contains the zirconia and the high-stabilizer-content zirconia. As shown in FIG. 3, the platinum 131 and the base 132 are mixed with each other and uniformly dispersed, and the detection electrode 130 is formed as a single layer as a whole.

FIG. 4 shows an image obtained by observing, with an SEM, the surface of the detection electrode 130 in a state before forming the base layer (sprayed layer) 190 of the porous protective layer 180. In FIG. 4, the white part represents the platinum (noble metal) 131, the gray part represents the base 132, and the black part represents the voids (gaps) 133. As shown in FIG. 4, the platinum 131 and the base 132 are mixed with each other and uniformly dispersed, and the detection electrode 130 is formed as a single layer as a whole.

The composition ratio of the noble metal, the zirconia or the low-stabilizer-content zirconia, and the high-stabilizer-content zirconia in the detection electrode 130 is determined by elementary analysis using an EPMA (Electron Probe Micro Analyzer).

It is speculated that, in the detection electrode 130, there are many very small cracks (micro cracks) that cannot be confirmed in an SEM image, an EPMA image, or the like. It is speculated that such cracks occur, during phase transition of the zirconia (or the low-stabilizer-content zirconia), at the interface between the zirconia (or the low-stabilizer-content zirconia), which undergoes a phase transition at high temperatures, and the high-stabilizer-content zirconia, which does not undergo a phase transition even at high temperatures, and the like.

The detection electrode 130 of the present embodiment has excellent water resistance. As described above, it is speculated that there are many very small cracks (micro cracks) in the detection electrode 130. It is speculated that, even if such a detection electrode 130 comes into contact with water in a high temperature state (for example, the temperature condition of a water test described below: 500° C. to 700° C.), the occurrence of a large crack is inhibited in the detection electrode 130. It is speculated that, since a large crack that occurs in the detection electrode 130 propagates to the solid electrolyte 110, the occurrence of a crack in the solid electrolyte 110 can also be inhibited by inhibiting occurrence of a large crack in the detection electrode 130. It is speculated that, in the detection electrode 130, the occurrence of a large crack is inhibited due to the presence of micro cracks even when the detection electrode 130 comes into contact with water.

Figure 5:
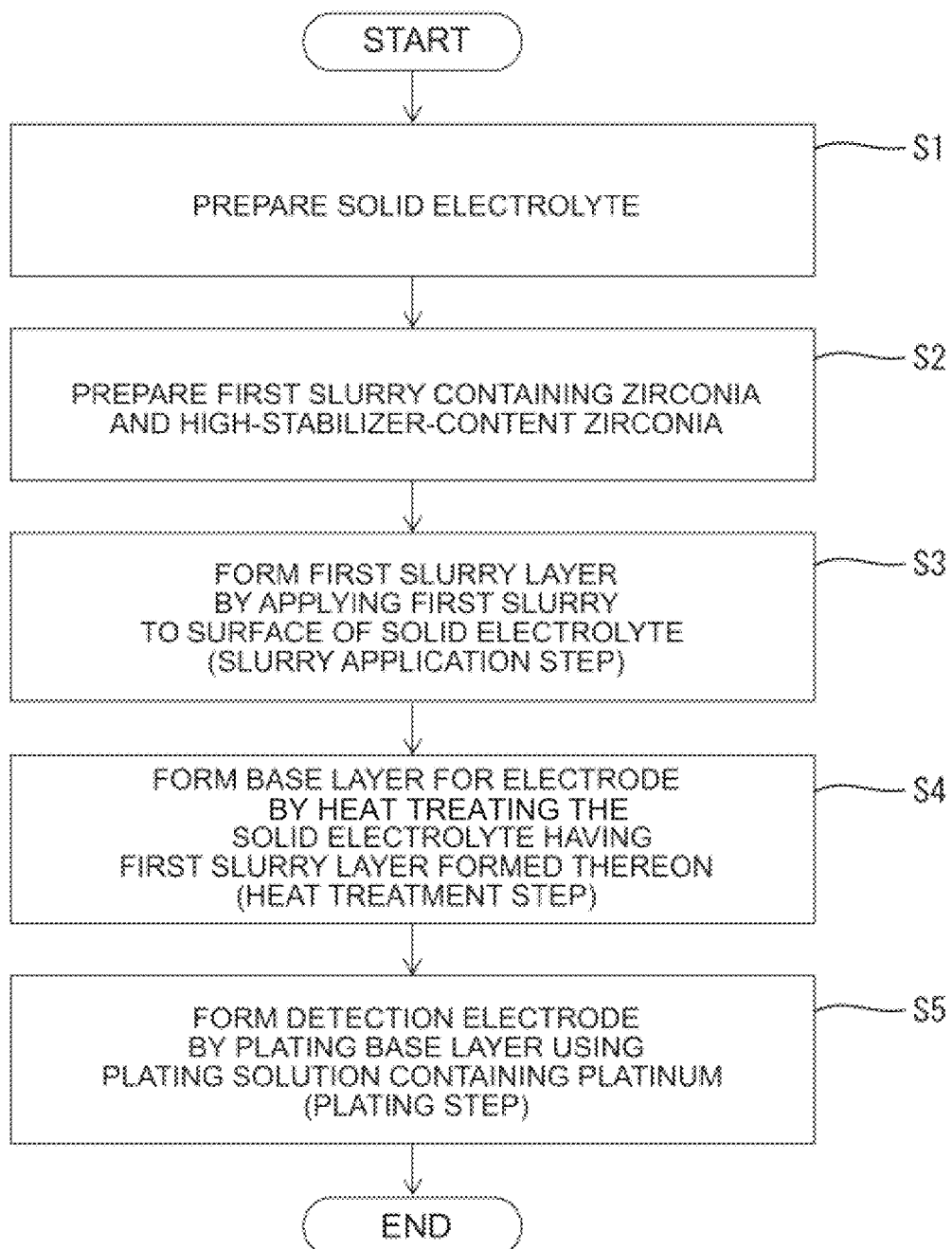
FIG. 5 is a flowchart showing a manufacturing process for the gas sensor element according to Embodiment 1.
Figure 6:
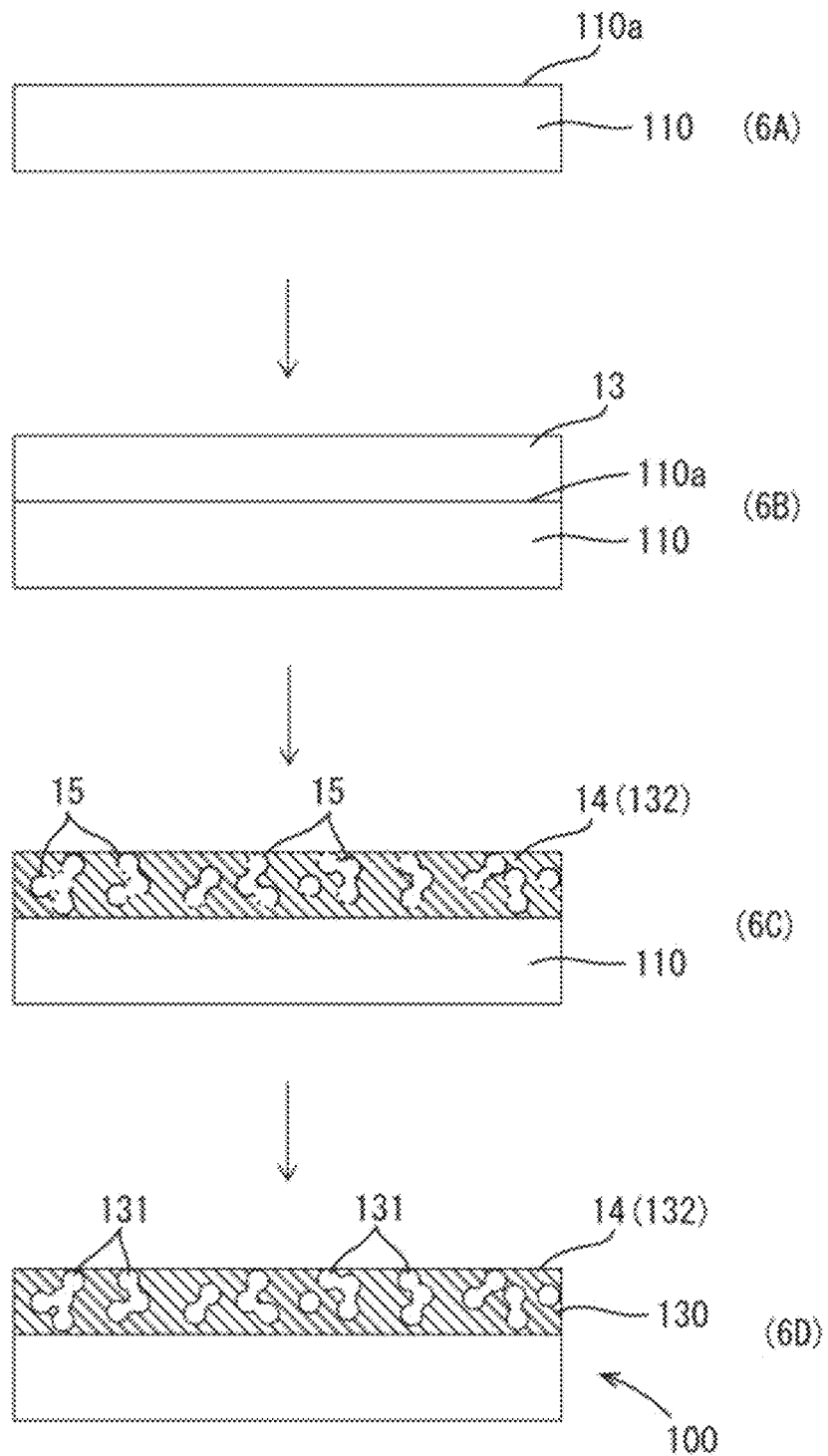
FIG. 6 is an explanatory diagram schematically illustrating the manufacturing process for the gas sensor element according to Embodiment 1.

Next, a method for manufacturing the gas sensor element 100 will be described. Here, a manufacturing process for the detection electrode 130 will be mainly described. FIG. 5 is a flowchart showing a manufacturing process for the gas sensor element 100 according to Embodiment 1, and FIG. 6 is an explanatory diagram schematically illustrating the contents of the manufacturing process for the gas sensor element 100 according to Embodiment 1. First, as shown in S1 of FIG. 5 and (6A) of FIG. 6, the solid electrolyte 110 is prepared. Here, the case of forming the detection electrode 130 on one surface (outer surface) 110a of the solid electrolyte 110 will be described.

Next, as shown in S2 of FIG. 5, a first slurry containing a predetermined amount of zirconia (powder) and a predetermined amount of high-stabilizer-content zirconia (powder) is prepared. In addition to the zirconia and the high-stabilizer-content zirconia, the first slurry contains a predetermined amount of an organic binder (for example, ethyl cellulose), a predetermined amount of a solvent (for example, butyl carbitol acetate), and the like. Moreover, as long as the object of the present invention is not impaired, a known additive such as a viscosity modifier, a pore forming agent, etc., may be added to the first slurry.

Subsequently, as shown in S3 of FIG. 5 and (6B) of FIG. 6, the first slurry is applied to the surface 110a of the solid electrolyte 110, and a layered first slurry layer 13 made of the first slurry is formed on the surface 110a of the solid electrolyte 110 (slurry application step). The method for applying the first slurry to the surface 110a of the solid electrolyte 110 is not particularly limited as long as the object of the present invention is not impaired, and, for example, dipping or a method using a known coating machine such as a coater is used.

After the first slurry layer 13 is formed, a drying step of drying the first slurry layer 13 using a heater or the like may be performed as necessary.

Thereafter, as shown in S4 of FIG. 5 and (6C) of FIG. 6, the zirconia and the high-stabilizer-content zirconia in the first slurry layer 13 are sintered by heat treating (for example, a baking treatment under a temperature condition of 1500° C.) the first slurry layer 13 on the solid electrolyte 110. In this manner, a base layer 14 for an electrode is formed on the solid electrolyte 110 (heat treatment step). During the heat treatment, the organic binder contained inside the first slurry layer 13 disappears, so that a trace of the disappearance of the organic binder becomes a pore 15. A plurality of (many) pores 15 are formed in the base layer 14.

The temperature condition in the heat treatment step is not particularly limited as long as the zirconia, the high-stabilizer-content zirconia, and the like in the first slurry layer 13 are sintered, and the pores 15 and the like are formed in the first slurry layer 13. For example, the heat treatment step is performed in the range of 1200° C. to 1600° C.

As shown in S5 of FIG. 5 and (6D) of FIG. 6, the base layer 14 is plated using a plating solution containing platinum (plating step). For example, in the case of applying platinum by electroless plating, a plating solution containing platinum, a reducing agent, etc., is brought into contact with the base layer 14, and the platinum is reduced and deposited on the base layer 14. As a result, the pores 15 of the base layer 14 are filled with the platinum 131. In this manner, the detection electrode 130 is formed on the solid electrolyte 110.

After the plating, a heat treatment may be performed on the detection electrode 130 formed on the solid electrolyte 110, as necessary (for example, in the case of flattening the unevenness of the platinum on the surface of the detection electrode 130).

As described above, the gas sensor element 100 in which the detection electrode 130 is formed on the solid electrolyte 110 can be manufactured. Through a manufacturing process similar to that for the detection electrode 130, the reference electrode 120 may be formed on the other surface (inner surface) of the solid electrolyte 110. In addition, the reference electrode 120 may be formed by electroless plating as described above.

The method of the present embodiment is a method for manufacturing a gas sensor element including the solid electrolyte 110 and an electrode (the detection electrode 130 or the like) formed on the surface of the solid electrolyte 110. The manufacturing method includes: a slurry application step of forming the first slurry layer 13 by applying, to the surface of the solid electrolyte 110, a first slurry containing zirconia or low-stabilizer-content zirconia to which a stabilizer is added in a proportion of 4 mol % or less (in terms of metal element) and high-stabilizer-content zirconia to which a stabilizer is added in a proportion of greater than 4 mol % (in terms of metal element) and not greater than 20 mol % (in terms of metal element); a heat treatment step of forming the base layer 14 by heat treating the solid electrolyte 110 having the first slurry layer 13 formed thereon; and a plating step of forming the electrode (detection electrode 130 or the like) by plating the base layer 14 using a plating solution containing a noble metal.

With the method for manufacturing the gas sensor element of the present embodiment, a gas sensor element having excellent water resistance is obtained.

In the method for manufacturing the gas sensor element of the present embodiment, the content of the zirconia or the low-stabilizer-content zirconia in the first slurry is preferably not less than 40 mass % and not greater than 90 mass % with respect to 100 mass % of the total amount of the zirconia or the low-stabilizer-content zirconia and the high-stabilizer-content zirconia. When this content is within such a range, the obtained gas sensor element has excellent water resistance.

In the method for manufacturing the gas sensor element of the present embodiment, the content of the zirconia or the low-stabilizer-content zirconia in the first slurry is preferably not less than 40 mass % and not greater than 70 mass % with respect to 100 mass % of the total amount of the zirconia or the low-stabilizer-content zirconia and the high-stabilizer-content zirconia. When this content is within such a range, the obtained gas sensor element has excellent water resistance and responsiveness.

In the method for manufacturing the gas sensor element of the present embodiment, the first slurry layer is formed using the first slurry containing the organic binder. However, in another embodiment, the pores 15 may be formed in the base layer 14 without using a volatilizing material such as an organic binder. That is, a volatilizing material such as an organic binder is not an essential component.

In the present embodiment, a predetermined amount of the monoclinic zirconia is contained in the first slurry. However, in another embodiment, monoclinic low-stabilizer-content zirconia may be contained instead of or together with the zirconia.

Embodiment 2

Figure 7:
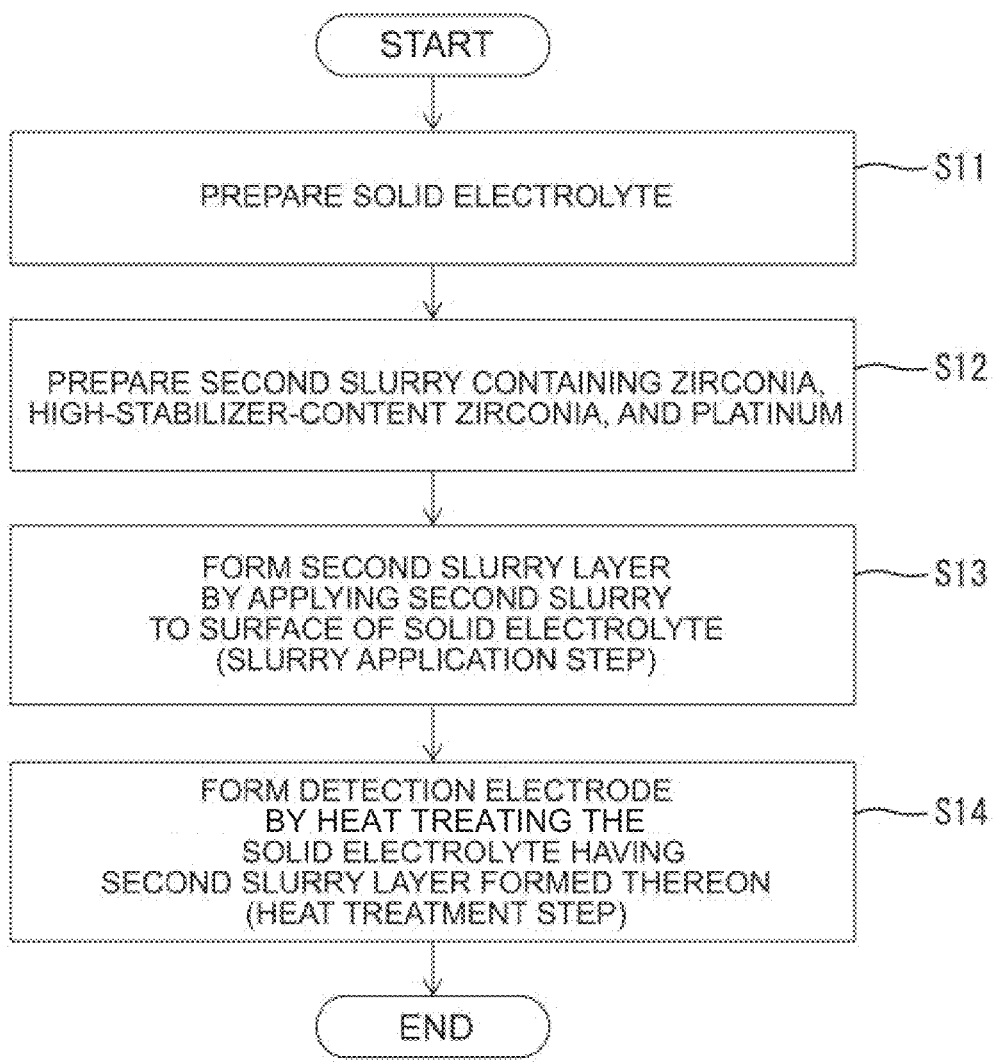
FIG. 7 is a flowchart showing a manufacturing process for a gas sensor element according to Embodiment 2.

Next, a method for manufacturing a gas sensor element 100A according to Embodiment 2 will be described with reference to FIG. 7 and FIG. 8. The gas sensor element 100A of the present embodiment can be used instead of the gas sensor element 100 of the sensor 10 of Embodiment 1. In addition, also in the present embodiment, similar to Embodiment 1 described above, a process for manufacturing a detection electrode 130A will be mainly described. FIG. 7 is a flowchart showing a process for manufacturing the gas sensor element 100A according to Embodiment 2, and FIG. 8 is an explanatory diagram schematically illustrating the contents of the process for manufacturing the gas sensor element 100A according to Embodiment 2.

Figure 8:
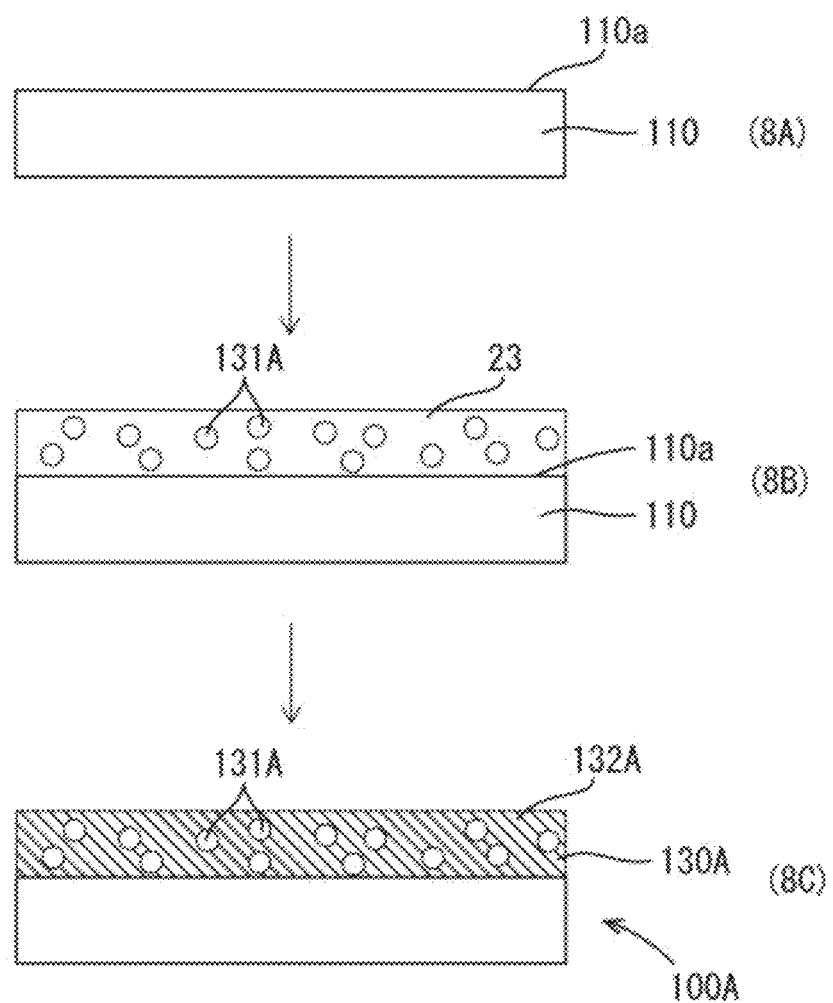
FIG. 8 is an explanatory diagram schematically showing the manufacturing process for the gas sensor element according to Embodiment 2.

First, as shown in S11 of FIG. 7 and (8A) of FIG. 8, a solid electrolyte 110 that is the same as in Embodiment 1 is prepared. Here, similar to Embodiment 1, the case of forming the detection electrode 130A on one surface (outer surface) 110a of the solid electrolyte 110 will be described.

Next, as shown in S12 of FIG. 7, a second slurry containing a predetermined amount of zirconia (powder) and predetermined high-stabilizer-content zirconia (powder), and a predetermined amount of platinum (powder) is prepared. In addition to the above, a predetermined amount of a solvent (for example, butyl carbitol acetate), a known additive such as a viscosity modifier, a pore forming agent, etc., may be added to the second slurry.

Subsequently, as shown in S13 of FIG. 7 and (8B) of FIG. 8, the second slurry is applied to the surface 110a of the solid electrolyte 110, and a layered second slurry layer 23 made of the second slurry is formed on the surface 110a of the solid electrolyte 110 (slurry application step). In the case of the present embodiment, platinum 131A is dispersed in the second slurry layer 23. The method for applying the second slurry to the surface 110a of the solid electrolyte 110 is not particularly limited as long as the object of the present invention is not impaired, and, for example, dipping or a method using a known coating machine such as a coater is used.

After the second slurry layer 23 is formed, a drying step of drying the second slurry layer 23 using hot air or the like may be performed as necessary.

Thereafter, as shown in S14 of FIG. 7 and (8C) of FIG. 8, the platinum, the zirconia, and the high-stabilizer-content zirconia in the second slurry layer 23 are sintered by heat treating (for example, a baking treatment under a temperature condition of 1500° C.) the second slurry layer 23 on the solid electrolyte 110. In this manner, the detection electrode 130A is formed on the solid electrolyte 110 (heat treatment step). The detection electrode 130A includes a base 132A containing the zirconia and the high-stabilizer-content zirconia, and the platinum 131A.

The temperature condition in the heat treatment step is not particularly limited as long as the platinum, the zirconia, the high-stabilizer-content zirconia, and the like in the second slurry layer 23 are sintered, and an electrode such as the detection electrode 130A is formed. For example, the heat treatment step is performed in the range of 1200° C. to 1600° C.

As described above, the gas sensor element 100A in which the detection electrode 130A is formed on the solid electrolyte 110 can be manufactured. A reference electrode (not shown) may be formed on the other surface (inner surface) of the solid electrolyte 110 through a manufacturing process similar to that for the detection electrode 130A, or by an electroless plating method or the like.

The method of the present embodiment is a method for manufacturing the gas sensor element 110A which includes the solid electrolyte 110 and an electrode (detection electrode 130A or the like) formed on the surface 110a of the solid electrolyte 110. The manufacturing method includes: a slurry application step of forming the second slurry layer 23 by applying, to the surface 110a of the solid electrolyte 110, a second slurry containing zirconia or low-stabilizer-content zirconia to which a stabilizer is added in a proportion of 4 mol % or less (in terms of metal element), high-stabilizer-content zirconia to which a stabilizer is added in a proportion of greater than 4 mol % (in terms of metal element) and not greater than 20 mol % (in terms of metal element), and a noble metal; and a heat treatment step of forming the electrode (detection electrode 130A or the like) by heat treating the solid electrolyte 110 having the second slurry layer 23 formed thereon.

With the method for manufacturing the gas sensor element of the present embodiment, a gas sensor element having excellent water resistance is obtained.

In the method for manufacturing the gas sensor element of the present embodiment, the content of the zirconia or the low-stabilizer-content zirconia in the second slurry is preferably not less than 40 mass % and not greater than 90 mass % with respect to 100 mass % of the total amount of the zirconia or the low-stabilizer-content zirconia and the high-stabilizer-content zirconia. When this content is within such a range, the obtained gas sensor element has excellent water resistance.

In the method for manufacturing the gas sensor element of the present embodiment, the content of the zirconia or the low-stabilizer-content zirconia in the second slurry is preferably not less than 40 mass % and not greater than 70 mass % with respect to 100 mass % of the total of the zirconia or the low-stabilizer-content zirconia and the high-stabilizer-content zirconia. When this content is within such a range, the obtained gas sensor element has excellent water resistance and responsiveness.

In the present embodiment, a predetermined amount of the monoclinic zirconia is contained in the second slurry. However, in another embodiment, monoclinic low-stabilizer-content zirconia may be contained instead of or together with the zirconia.

Embodiment 3

Next, a gas sensor element 100B according to Embodiment 3 will be described with reference to FIG. 9 and FIG. 10. Unlike the tubular gas sensor elements 100 and 100A of Embodiments 1 and 2, the gas sensor element 100B of the present embodiment has a plate shape. The gas sensor element 100B has a long plate shape as a whole. The gas sensor element 100B is used in a gas sensor (not shown) for detecting the gas concentration of a specific gas (for example, oxygen, $NO_x$, etc.) in exhaust gas.

Similar to the above-mentioned Embodiment 1, etc., the gas sensor in which the gas sensor element 100B of the present embodiment is used includes known components such as a metal shell. The metal shell is a tubular metal member that surrounds the periphery of the gas sensor element 100B, and holds the gas sensor element 100B in a state where the gas sensor element 100B is housed therein. The metal shell is also used when mounting the gas sensor to an exhaust pipe, for example.

Figure 9:
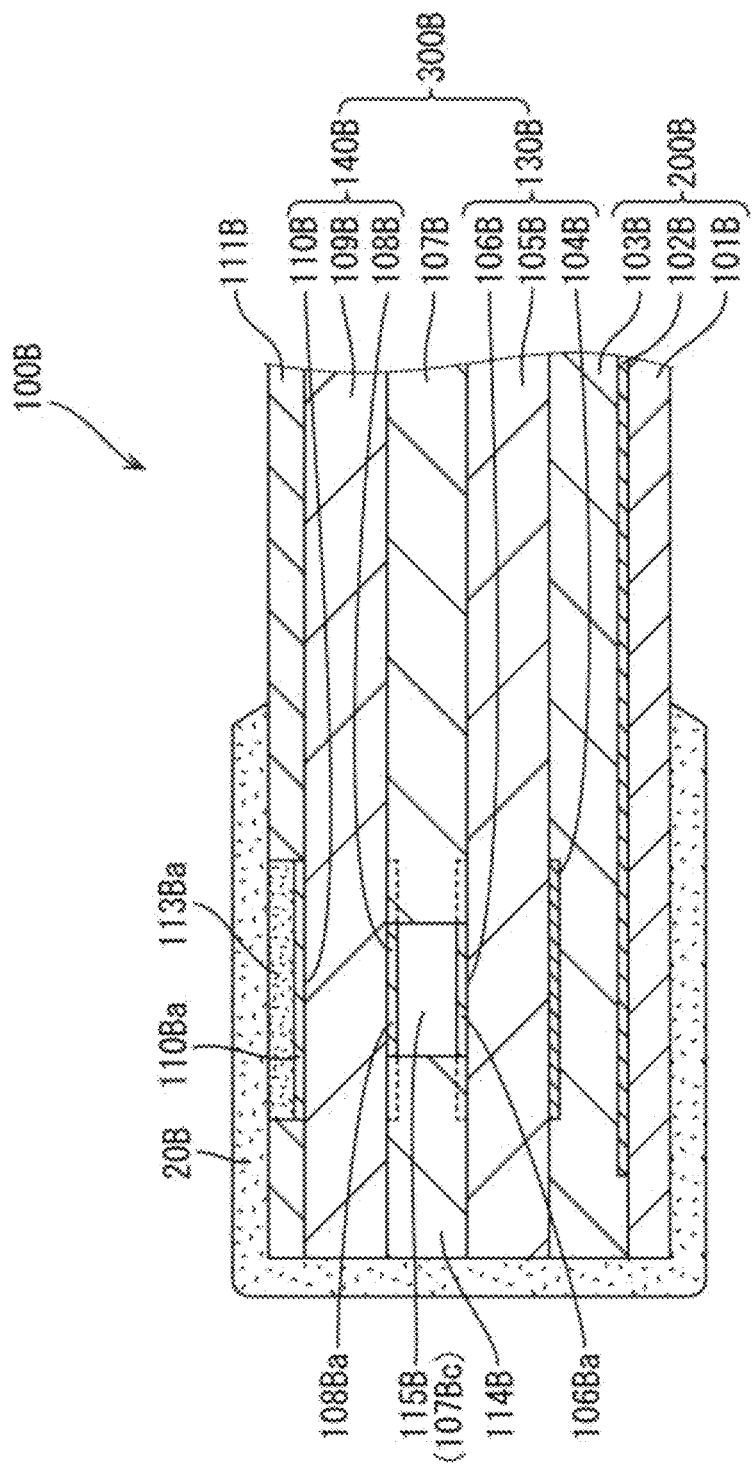
FIG. 9 is a cross-sectional view of a gas sensor element according to Embodiment 3 taken along the longitudinal direction thereof.
Figure 10:
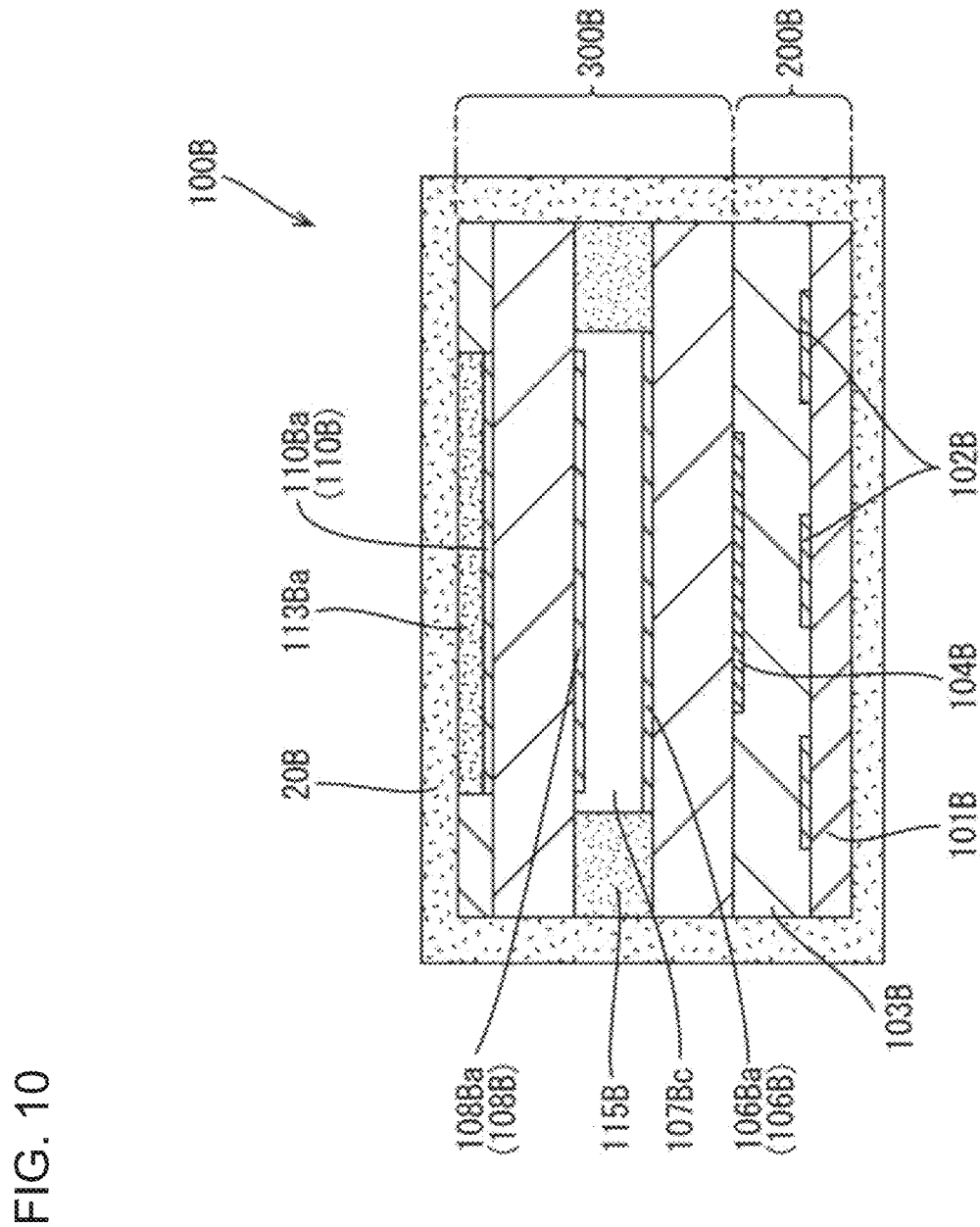
FIG. 10 is a cross-sectional view of the gas sensor element according to Embodiment 3 taken along the width direction thereof.

FIG. 9 is a cross-sectional view of the gas sensor element 100B according to Embodiment 3 taken along the longitudinal direction thereof, and FIG. 10 is a cross-sectional view of the gas sensor element 100B according to Embodiment 3 taken along the width direction thereof. FIG. 9 and FIG. 10 show the front side of the gas sensor element 100B.

The gas sensor element 100B includes a detection element portion 300B and a heater portion 200B stacked thereon. The heater portion B includes: a first base 101B and a second base 103B mainly composed of alumina; and a heating element 102B sandwiched between the first base 101B and the second base 103B and mainly composed of platinum.

The detection element portion 300B includes an oxygen concentration detection cell 130B and an oxygen pump cell 140B. The oxygen concentration detection cell 130B is formed of a first solid electrolyte 105B, and a first electrode 104B and a second electrode 106B that are formed on both surfaces of the first solid electrolyte 105B. The second electrode 106B includes a second electrode portion 106Ba facing a hollow measurement chamber 107Bc described below.

The oxygen pump cell 140B is formed of a second solid electrolyte 109B, and a third electrode 108B and a fourth electrode 110B that are formed on both surfaces of the second solid electrolyte 109B. The third electrode 108B includes a third electrode portion 108Ba facing the hollow measurement chamber 107Bc described later. The fourth electrode 110B includes a fourth electrode portion 110Ba overlapping an electrode protection portion 113Ba described below.

The first solid electrolyte 105B and the second solid electrolyte 109B are each composed of, for example, a partially stabilized zirconia sintered body obtained by adding yttria ($Y_2O_3$) or the like to zirconia ($ZrO_2$).

An insulating layer 107B is formed between the oxygen pump cell 140B and the oxygen concentration detection cell 130B. The insulating layer 107B includes an insulating portion 114B and a diffusion resistance portion 115B. The hollow measurement chamber 107Bc is formed in the insulating portion 114B of the insulating layer 107B at a position corresponding to the second electrode portion 106Ba and the third electrode portion 108Ba. The measurement chamber 107Bc communicates with the outside in the width direction of the insulating layer 107B, and a diffusion resistance portion 115B that allows for gas diffusion between the outside and the measurement chamber 107Bc under a predetermined rate-determining condition is disposed at the communication portion of the measurement chamber 107Bc.

The insulating portion 114B is composed of a ceramic sintered body having an insulation property (for example, an oxide-based ceramic material such as alumina or mullite). The diffusion resistance portion 115B is composed of, for example, a porous body of alumina.

A protective layer 111B is formed on the surface of the second solid electrolyte 109B such that the fourth electrode 110B is sandwiched therebetween. The protective layer 111B includes, at the position overlapping the fourth electrode portion 110Ba of the fourth electrode 110B, the porous electrode protection portion 113Ba for protecting the fourth electrode portion 110Ba from poisoning.

A porous protective layer 20B is formed so as to surround the entire periphery of the front side of the gas sensor element 100B.

In the gas sensor element 100B, the direction and the magnitude of a current flowing between electrodes of the oxygen pump cell 140B are adjusted such that an electromotive force generated between the electrodes of the oxygen concentration detection cell 130B becomes a predetermined value (for example, 450 mV).

In such a gas sensor element 100B of the present embodiment, the electrodes that may be directly exposed to exhaust gas outside the sensor are the second electrode portion 106Ba of the second electrode 106B, the third electrode portion 108Ba of the third electrode 108B, and the fourth electrode portion 110Ba of the fourth electrode 110B.

Both the second electrode portion 106Ba of the second electrode 106B and the third electrode portion 108Ba of the third electrode 108B come into contact with exhaust gas that has entered the measurement chamber 107Bc through the porous protective layer 20B and the diffusion resistance portion 115Ba. In addition, the fourth electrode portion 110Ba of the fourth electrode 110B comes into contact with exhaust gas that has passed through the porous protective layer 20B and the electrode protection portion 113Ba. That is, moisture such as exhaust condensed water may come into contact with these electrode portions.

Therefore, in the gas sensor element 100B of the present embodiment, the second electrode portion 106Ba, the third electrode portion 108Ba, and the fourth electrode portion 110Ba are made of a material that has water resistance and that is the same as those of the detection electrodes 130 and 130A of Embodiments 1 and 2 described above. That is, each of such electrodes (electrode portions) contains zirconia or low-stabilizer-content zirconia to which a stabilizer is added in a proportion of 4 mol % or less (in terms of metal element), high-stabilizer-content zirconia to which a stabilizer is added in a proportion of greater than 4 mol % (in terms of metal element) and not greater than 20 mol % (in terms of metal element), and a noble metal, and is composed of a single layer.

As described above, an electrode made of a predetermined material having water resistance may be formed on the gas sensor element 100B that is included in a plate-shaped sensor.

EXAMPLES

Hereinafter, the present invention will be described in further detail by way of the following Examples. The present invention is not limited to these examples in any way.

Example 1

A gas sensor element of Example 1 having the same basic configuration as the gas sensor element 100 of the sensor 10 described above was produced. The electrodes (detection electrode and reference electrode) of the gas sensor element were produced by the method described below.

First, a predetermined amount of an organic binder (ethyl cellulose) and a predetermined amount of a solvent (butyl carbitol acetate) were mixed while blending a predetermined amount of powdery zirconia ($ZrO_2$) and a predetermined amount of powdery high-stabilizer-content zirconia obtained by adding (doping) yttrium oxide ($Y_2O_3$) as a stabilizer to zirconia ($ZrO_2$) in a proportion of 4.6 mol % (9.2 mol % in terms of metal element), in proportions (mass %) shown in Table 1, to prepare a slurry. In Table 1, the zirconia is represented as "$ZrO_2$", and the high-stabilizer-content zirconia is represented as "YSZ (High)".

Subsequently, a solid electrolyte was immersed (dipped) in the slurry to form a slurry layer on the surface of the solid electrolyte. Then, the slurry layer was dried by hot air drying.

Next, the slurry layer on the solid electrolyte was heat treated under a temperature condition of 1500° C. to sinter the slurry layer, thereby forming a base layer including a plurality of pores therein.

Then, a plating solution containing platinum as a noble metal was prepared, and the platinum was reduced and deposited on the base layer by electroless plating using the plating solution. In this manner, the detection electrode and the reference electrode were formed on the surface (outer surface, inner surface) of the solid electrolyte.

In the gas sensor element of Embodiment 1, the detection electrode was exposed, and a porous protective layer and the like were not formed.

Examples 2 to 6 and Comparative Examples 1 to 5

Gas sensor elements of Examples 2 to 6 and Comparative Examples 1 to 4 were produced in the same manner as Example 1, except that the blending proportions of the zirconia and the high-stabilizer-content zirconia in the slurry were changed to the values shown in Table 1.

Water Test

A water test was performed on the gas sensor elements of each Example and each Comparative Example according to the procedure described below. First, a predetermined voltage was applied to the ceramic heater in the gas sensor element to cause a heating portion housed inside the front end portion of the gas sensor element to generate heat to reach a specified temperature (initially 500° C.), thereby raising the temperature of the front end portion (detection portion) of the gas sensor element. The front end portion of a gas sensor element 100T is covered with a detection electrode 130T.

Figure 11:
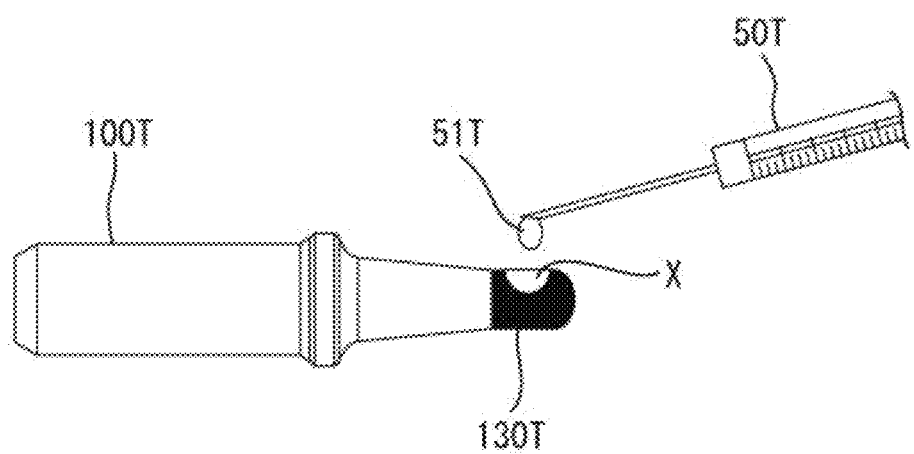
FIG. 11 is an explanatory diagram schematically illustrating a process for dropping a water drop onto a detection electrode of a gas sensor element in a water test.

FIG. 11 is an explanatory diagram schematically illustrating a process for dropping a water drop onto the detection electrode 130T of the gas sensor element 100T in the water test. As shown in FIG. 11, the gas sensor element is disposed such that the longitudinal direction (axial line direction) of the gas sensor element extends horizontally. The detection electrode 130T has a tubular shape as a whole, and the heating portion is disposed inside the detection electrode 130T. When the heating portion generates heat, the detection electrode 130T disposed around the heating portion is heated and the temperature thereof becomes high. With respect to the detection electrode 130T, a portion surrounding the periphery of the heating portion is heated most and the temperature thereof is increased. In the water test, a specified amount (here, 2 μL) of a water drop 51T is dropped onto such a portion (highest heat generating portion) X that is heated most and the temperature of which becomes the highest, by using a micro syringe 50T. Such dropping of a water drop was performed once in total.

Thereafter, the heat generation of the heating portion was stopped, and the gas sensor element 100 was allowed to stand to cool until the temperature of the heating portion reached room temperature (25° C.).

Figure 12:
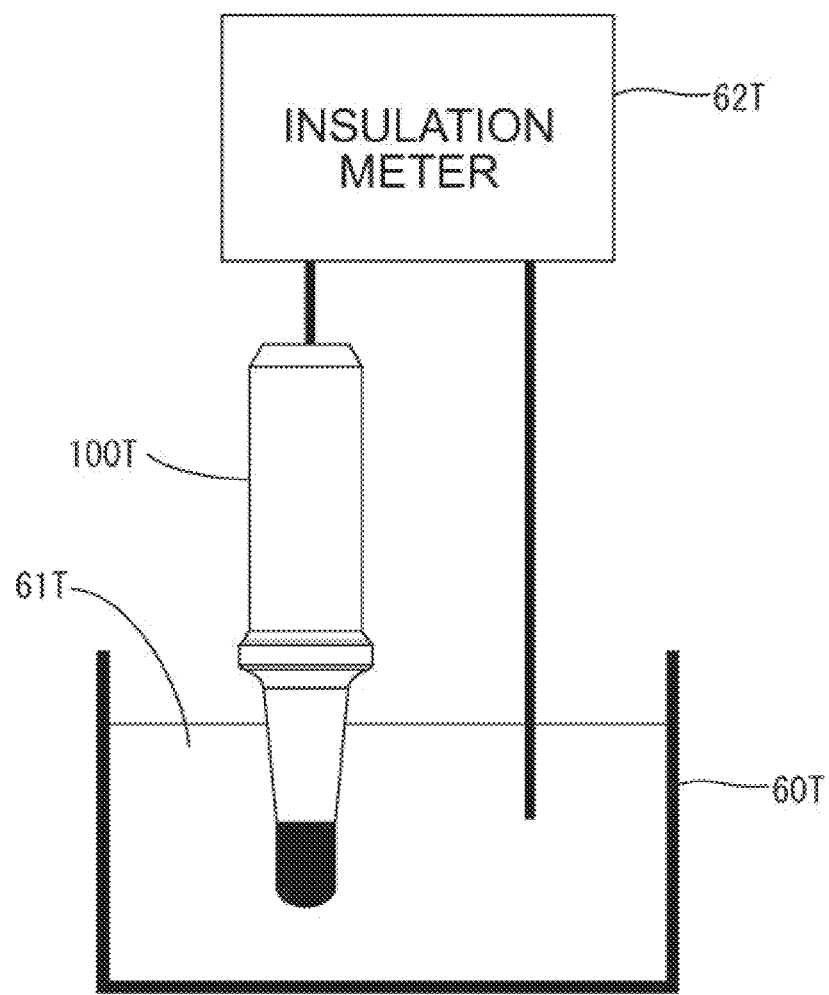
FIG. 12 is an explanatory diagram schematically illustrating a process for checking a crack in a gas sensor element using an insulation meter in the water test.

FIG. 12 is an explanatory diagram schematically illustrating a process for checking a crack in the gas sensor element 100T using an insulation meter 62T in the water test. As shown in FIG. 12, the insulation meter 62T was prepared, one terminal of the insulation meter 62T was connected to the reference electrode (inner electrode) of the gas sensor element 100T, and another terminal of the insulation meter 62T was connected to water 61T contained in a predetermined bath 60T. Then, the front side of the gas sensor element 100T was placed in the water 61T such that the detection electrode 130T was submerged therein, and it was confirmed whether or not a current flowed between the detection electrode 130T and the reference electrode. If a crack has formed in the detection electrode 130T of the gas sensor element 100T or the like, water seeps into the crack and electricity flows between the detection electrode 130T and the reference electrode. Therefore, if no current flows between the detection electrode 130T and the reference electrode, it can be determined that no crack has occurred in the detection electrode 130 and the like. The results are shown in Table 1.

If there was no crack in the gas sensor element 100T, the specified temperature of the heating portion was set sequentially higher as shown in Table 1, and the presence/absence of a crack in the gas sensor element 100T was checked for each specified temperature. The above water test was performed until a crack occurred in the gas sensor element 100T. The upper limit of the specified temperature of the heating portion was set to 700° C. In Table 1, the case where a crack occurred in the gas sensor element 100T as a result of the water test is represented as "x", and the case where a crack did not occur in the gas sensor element 100T as a result of the water test is represented as "○".

TABLE 1

| | SLURRY | | ELECTRODE TEMPERATURE (SPECIFIED TEMPERATURE) ° C. | | | | | | | |
|---|---|---|---|---|---|---|---|---|---|---|
| | COMPONENT | PROPORTION (wt %) | 500 | 550 | 575 | 600 | 625 | 650 | 675 | 700 |
| COMPARATIVE EXAMPLE 1 | $ZrO_2$ YSZ(High) | 0 100 | x | | | | | | | |
| COMPARATIVE EXAMPLE 2 | $ZrO_2$ YSZ(High) | 10 90 | x | | | | | | | |
| COMPARATIVE EXAMPLE 3 | $ZrO_2$ YSZ(High) | 20 80 | ○ | x | | | | | | |
| EXAMPLE 1 | $ZrO_2$ YSZ(High) | 40 60 | ○ | ○ | ○ | ○ | ○ | ○ | ○ | ○ |
| EXAMPLE 2 | $ZrO_2$ YSZ(High) | 50 50 | ○ | ○ | ○ | ○ | ○ | ○ | ○ | ○ |
| EXAMPLE 3 | $ZrO_2$ YSZ(High) | 60 40 | ○ | ○ | ○ | ○ | ○ | ○ | x | |
| EXAMPLE 4 | $ZrO_2$ YSZ(High) | 70 30 | ○ | ○ | ○ | ○ | ○ | ○ | ○ | x |
| EXAMPLE 5 | $ZrO_2$ YSZ(High) | 80 20 | ○ | ○ | ○ | ○ | ○ | ○ | ○ | ○ |
| EXAMPLE 6 | $ZrO_2$ YSZ(High) | 90 10 | ○ | ○ | ○ | ○ | ○ | ○ | ○ | ○ |
| COMPARATIVE EXAMPLE 5 | $ZrO_2$ YSZ(High) | 100 0 | ○ | ○ | ○ | x | | | | |

In each gas sensor element used in the water test, the detection electrode is not covered with a porous protective layer or the like, and is exposed. That is, the water test was performed in a much harsher environment than a normal usage environment. As a result of such a water test, as shown in Table 1, in each of the gas sensor elements of Examples 1 to 6, it was confirmed that a crack did not occur in the detection electrode and the like when the specified temperature (electrode temperature) was 625° C.

For Examples 1, 2, 5, and 6, it was confirmed that a crack did not occur in the detection electrode and the like even when the specified temperature (electrode temperature) is 700° C. For Example 4, it was confirmed that a crack did not form in the detection electrode and the like when the specified temperature was increased up to 675° C. For Example 3, it was confirmed that a crack did not occur in the detection electrode and the like when the specified temperature was up to 650° C.

On the other hand, for Comparative Examples 1 and 2, the occurrence of a crack was confirmed when the specified temperature was 500° C.; for Comparative Example 3, the occurrence of a crack was confirmed when the specified temperature was 550° C.; and for Comparative Example 4, the occurrence of a crack was confirmed when the specified temperature was 575° C. In addition, for Comparative Example 5, the occurrence of a crack was confirmed when the specified temperature was 600° C.

Response Test

Sensors including the gas sensor elements of each Example and each Comparative Example were produced.

The basic configuration of each sensor is the same as that of the sensor 10 described above. In each of the sensors for a response test, a porous protective layer is formed on a detection electrode with a base layer interposed therebetween.

Each of the sensors of each Example and each Comparative Example was mounted to an exhaust pipe of an internal combustion engine, and a response time (rich response time) in the case where an air-fuel ratio (A/F) shifted from a lean state to a rich state and a response time (lean response time) in the case where the air-fuel ratio (A/F) shifted from the rich state to the lean state, were measured.

The rich response time is the time (msec) until the sensor output reaches 800 mV from 450 mV when the air-fuel ratio shifts from the lean state to the rich state (from $\lambda$=1.03 to $\lambda$=0.97).

The lean response time is the time (msec) until the sensor output reaches 100 mV from 450 mV when the air-fuel ratio shifts from the rich state to the lean state (from $\lambda$=0.97 to $\lambda$=1.03).

Figure 13:
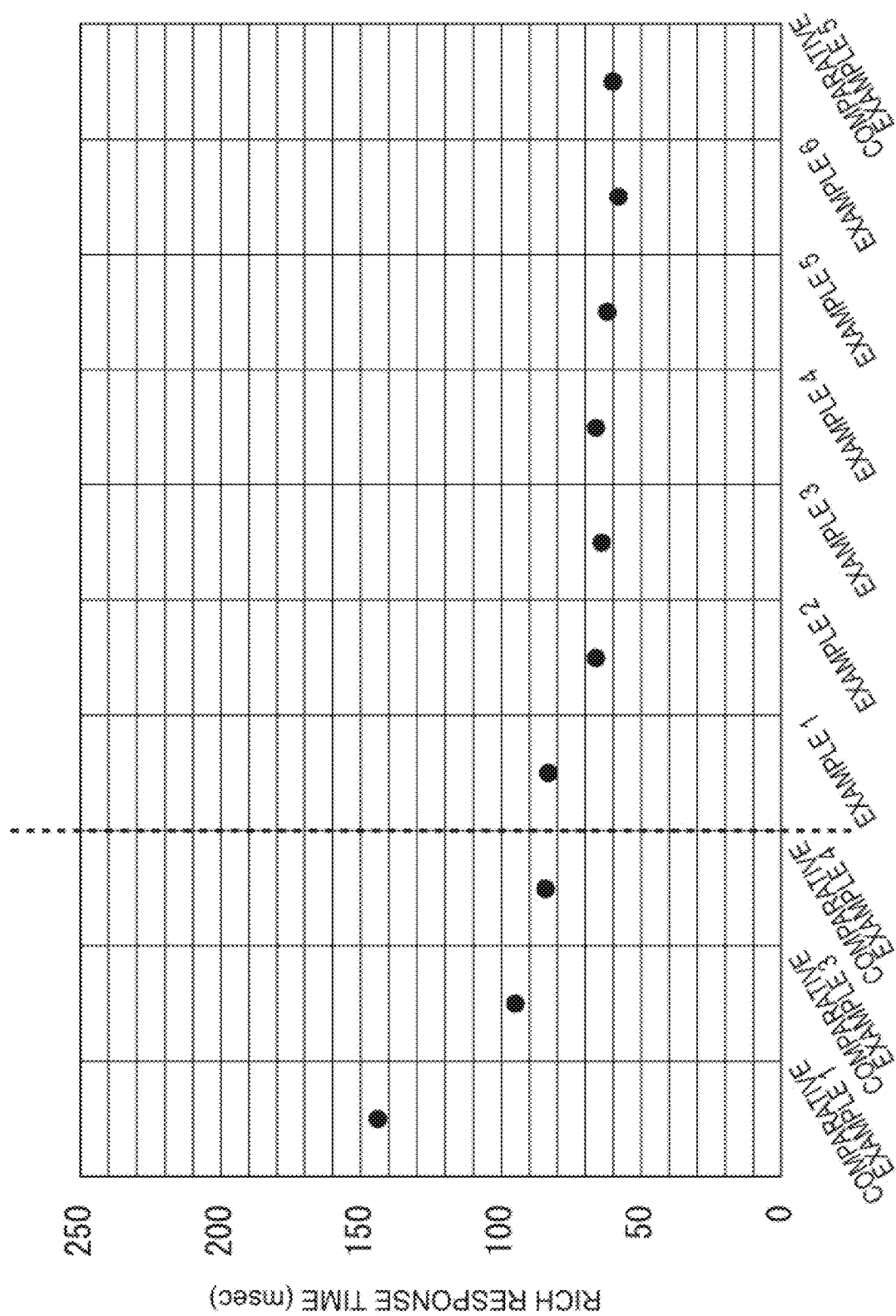
FIG. 13 is a graph showing rich response times of each example and each comparative example.
Figure 14:
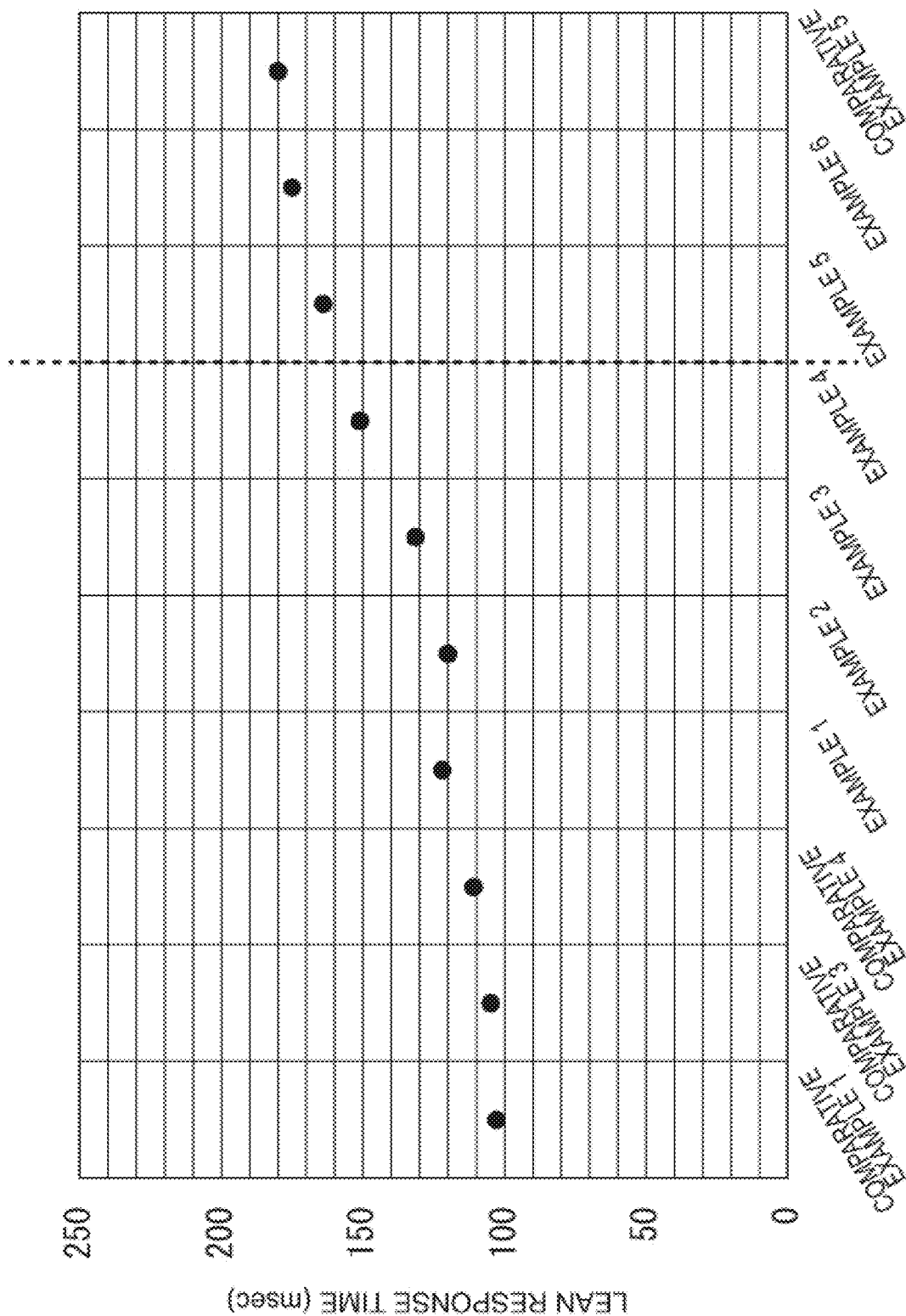
FIG. 14 is a graph showing lean response times of each example and each comparative example.

The results of the rich response time for each Example and each Comparative Example are shown in FIG. 13, and the results of the lean response time for each Example and each Comparative Example are shown in FIG. 14.

FIG. 13 is a graph showing the results of the rich response times of the sensors of each Example and each Comparative Example. As shown in FIG. 13, it was confirmed that, when the blending proportion of the high-stabilizer-content zirconia is high (Comparative Example 1 to Comparative Example 4), the rich response time tends to become longer, and the responsiveness tends to be deteriorated. On the other hand, it was confirmed that, when the blending proportion of the high-stabilizer-content zirconia is low (Examples 1 to 6 and Comparative Example 5), the rich response time becomes shorter, and the responsiveness is excellent.

FIG. 14a graph showing the results of the lean response times of the sensors of each Example and each Comparative Example. As shown in FIG. 14, it was confirmed that, when the blending proportion of the zirconia is high (Examples 5 and 6 and Comparative Example 5), the lean response time tends to become longer, and the responsiveness tends to be deteriorated. On the other hand, it was confirmed that, when the blending proportion of the zirconia is low (Examples 1 to 4 and Comparative Examples 1 to 4), the lean response time becomes shorter, and the responsiveness is excellent.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. A gas sensor element comprising a solid electrolyte and an electrode formed on a surface of the solid electrolyte, wherein the electrode contains monoclinic zirconia, tetragonal/cubic zirconia, and a noble metal, the electrode is a single layer electrode, the noble metal is contained in a proportion of 85 mass % or less with respect to a total mass of the electrode, and a content of the monoclinic zirconia in the single layer electrode is not less than 40 mass % and not greater than 90 mass % with respect to 100 mass % of a total amount of the monoclinic zirconia and the tetragonal/cubic zirconia.

2. A gas sensor comprising:

the gas sensor element according to claim 1; and a metal shell holding the gas sensor element.

3. A method for manufacturing a gas sensor element according to claim 1, the method comprising:

a slurry application step of forming a first slurry layer by applying a first slurry containing monoclinic zirconia and tetragonal/cubic zirconia to the surface of the solid electrolyte;

a heat treatment step of forming a base layer by heat treating the solid electrolyte having the first slurry layer formed thereon; and a plating step of forming the electrode by plating the base layer using a plating solution containing a noble metal, wherein the electrode is a single layer electrode, the noble metal is contained in a proportion of 85 mass % or less with respect to a total mass of the electrode, a content of the monoclinic zirconia in the single layer electrode is not less than 40 mass % and not greater than 90 mass % with respect to 100 mass % of a total amount of the monoclinic zirconia and the tetragonal/cubic zirconia.

4. The method for manufacturing the gas sensor element as claimed in claim 3, wherein the content of the monoclinic zirconia in the first slurry is not less than 40 mass % and not greater than 70 mass % with respect to 100 mass % of the total amount of the monoclinic zirconia and the tetragonal/cubic zirconia.

5. A method for manufacturing a gas sensor element according to claim 1, the method comprising:

a slurry application step of forming a second slurry layer by applying a second slurry containing monoclinic zirconia, tetragonal/cubic zirconia, and a noble metal to the surface of the solid electrolyte; and a heat treatment step of forming the electrode by heat treating the solid electrolyte having the second slurry layer formed thereon, wherein the electrode is a single layer electrode, and the noble metal is contained in a proportion of 85 mass % or less with respect to a total mass of the electrode, and a content of the monoclinic zirconia in the second slurry is not less than 40 mass % and not greater than 90 mass % with respect to 100 mass % of a total amount of the monoclinic zirconia and the tetragonal/cubic zirconia.

6. The method for manufacturing the gas sensor element as claimed in claim 5, wherein the content of the monoclinic zirconia in the second slurry is not less than 40 mass % and not greater than 70 mass % with respect to 100 mass % of the total amount of the monoclinic zirconia and the tetragonal/cubic zirconia.

* * * * *